(12) United States Patent
Aota et al.

(10) Patent No.: US 7,706,049 B2
(45) Date of Patent: Apr. 27, 2010

(54) MIRROR DEVICE AND OPTICAL APPARATUS

(75) Inventors: Hirofumi Aota, Kawasaki (JP); Kohei Shibata, Kawasaki (JP); Tamotsu Akashi, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 12/033,959

(22) Filed: Feb. 20, 2008

(65) Prior Publication Data
US 2008/0239441 A1   Oct. 2, 2008

(30) Foreign Application Priority Data
Mar. 29, 2007   (JP)   ............................. 2007-087061

(51) Int. Cl.
  G02B 26/00   (2006.01)
(52) U.S. Cl. ...................................... 359/291; 359/290

(58) Field of Classification Search ................. 359/290, 359/291, 238, 245; 385/17, 18, 35
See application file for complete search history.

(56) References Cited

U.S. PATENT DOCUMENTS
2006/0266933 A1 * 11/2006 Chang et al. ................. 250/216

FOREIGN PATENT DOCUMENTS
| JP | 8-148594 | 6/1996 |
| JP | 2003-43418 | 2/2003 |
| JP | 2005-136119 | 5/2005 |

* cited by examiner

Primary Examiner—Timothy J Thompson
(74) Attorney, Agent, or Firm—Staas & Halsey LLP

(57) ABSTRACT

The present mirror device for suppressing PDL on the assumption of multiple modes of angles of input light and output light to movable mirrors with respect to the crystal axis of a crystal member at the time light passes through the crystal member. The mirror device includes a mirror system 2 and a flat-shaped crystal member 3 which is arranged in such a manner that a first angle is not larger than a second angle. The crystal member is constructed in such a manner that a third angle is substantially equal to a half of a fourth angle.

22 Claims, 18 Drawing Sheets

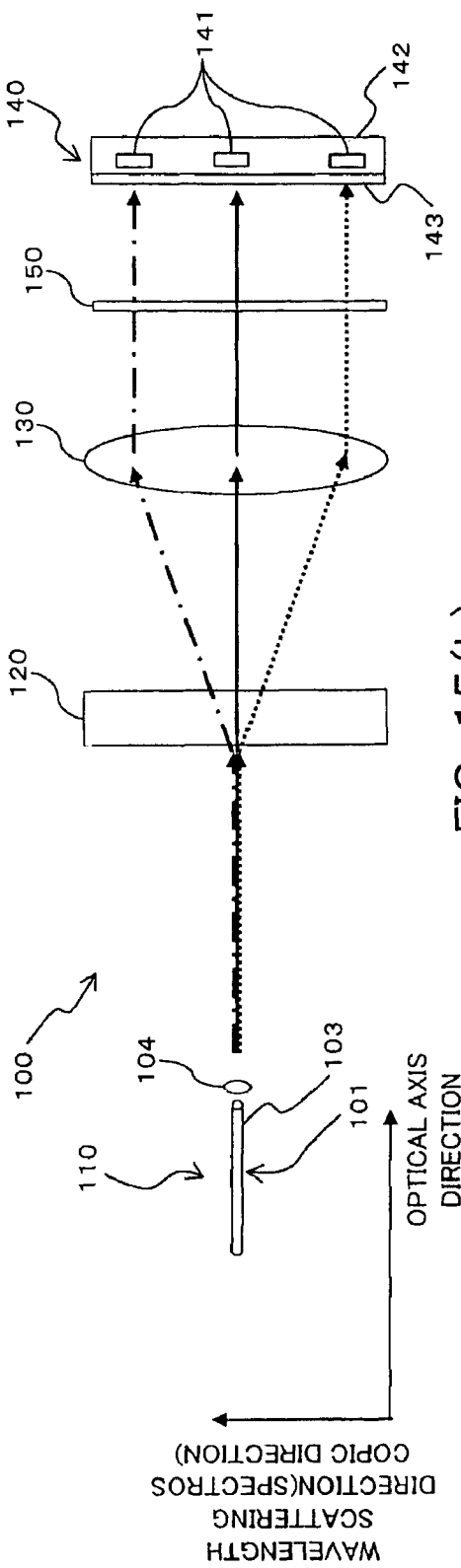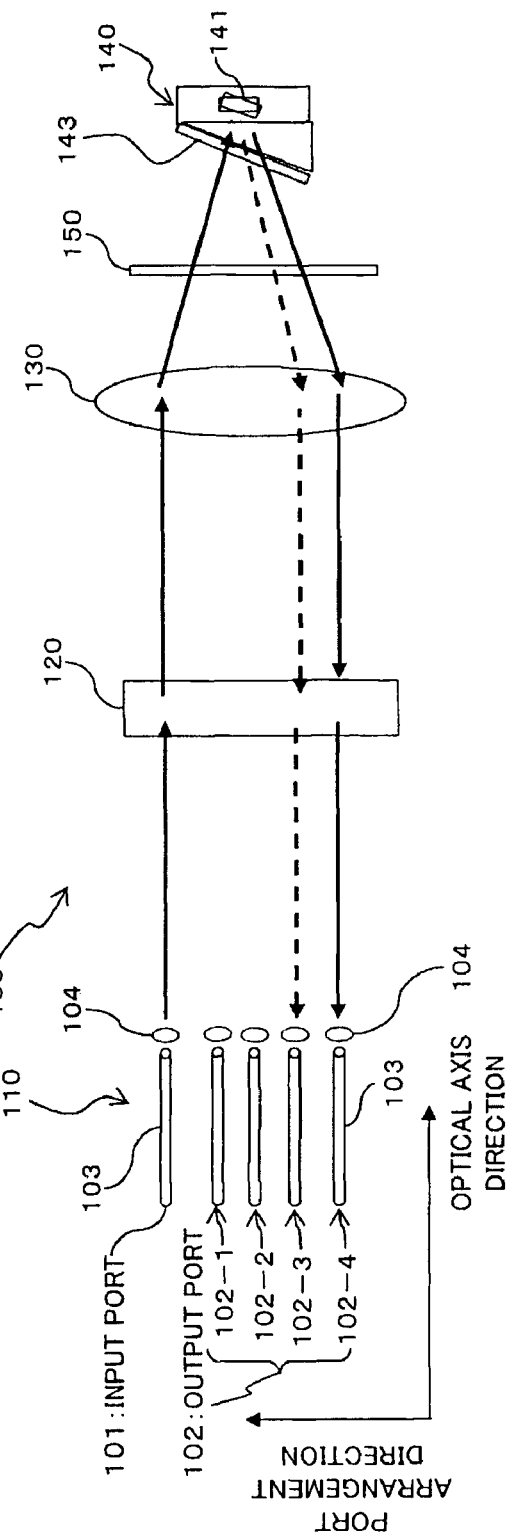
FIG. 15(a) RELATED ART
FIG. 15(b) RELATED ART

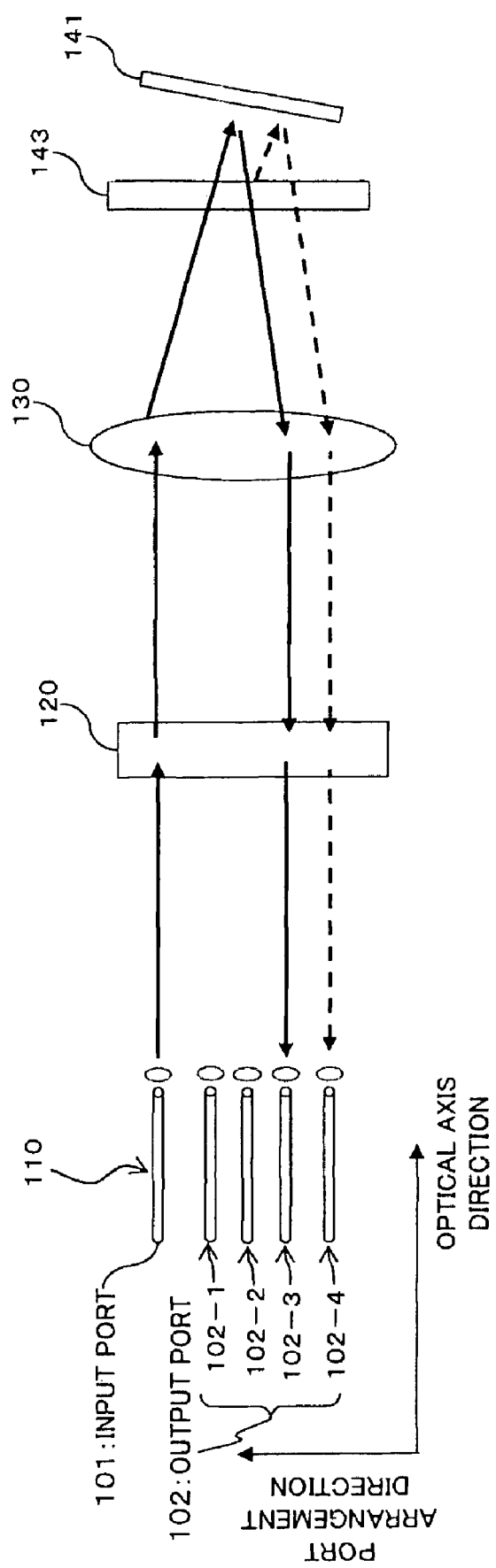

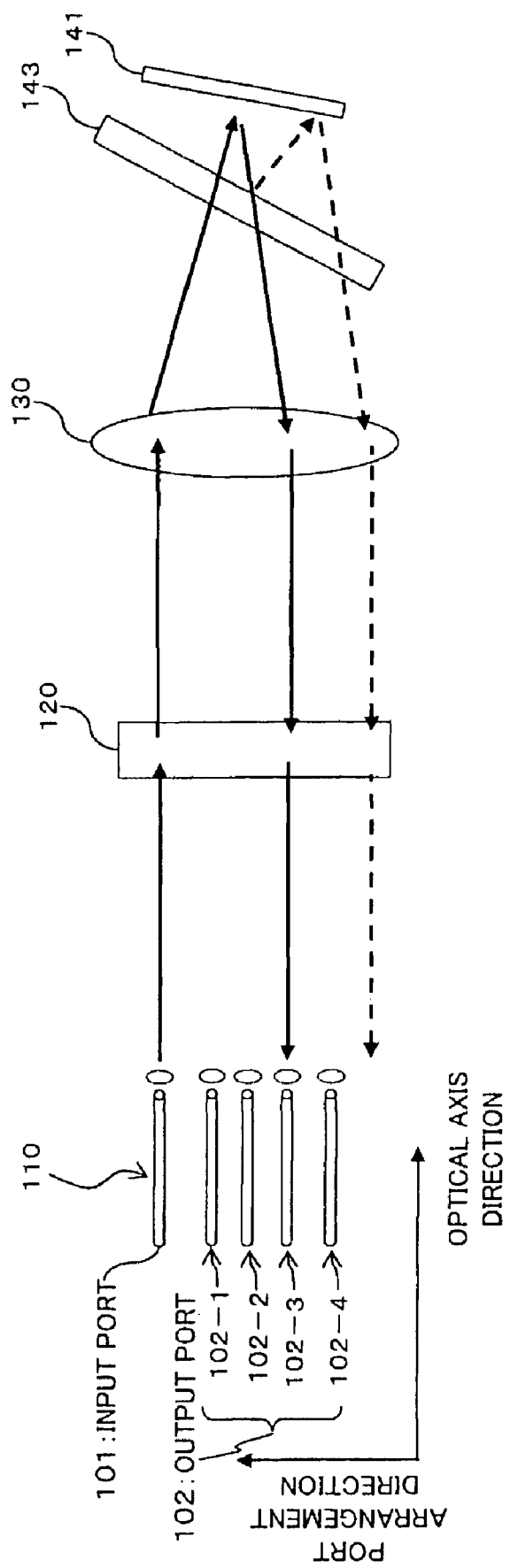

MIRROR DEVICE AND OPTICAL APPARATUS

BACKGROUND OF THE INVENTION

1) Field of the Invention

The present invention relates to a mirror device and an optical apparatus suitable for use in an optical communications system.

2) Description of the Related Art

As is widely well known in these days, to convert networks with Wavelength Division Multiplexing (WDM) as the core thereof into optical networks, has been progressed in high speed, in order to accommodate outstandingly increasing internet traffic. Although WDM of these days mainly has a point-to-point network form, it is expected that it will advance to ring-shaped networks and mesh-formed networks in the near future.

To support this, each of the nodes forming a network will be capable of performing processing such as add/drop of an arbitrary wavelength, thereby making it possible to perform processing of whole Optical Cross Connect (OXC) without electric conversion so that dynamic setting/releasing of paths will be performed on the basis of wavelength information. As to such progress in photonic networks which make the best use of optical technology, a detailed discrimination is described in, for example, the journal of the Institute of Electronics, Information, and Communication Engineers, February 2002, pp. 94 through 103.

FIG. 15(a) and FIG. 15(b) each show conceptual diagrams of an optical apparatus 100 (hereinafter, referred to as a wavelength selection switch 100) which operates as a common wavelength selection switch. FIG. 15(a) is a schematic upper view of the wavelength selection switch 100; FIG. 15(b) is a schematic side view of the wavelength selection switch 100. The wavelength selection switch 100 shown in FIG. 15(a) and FIG. 15(b) as an example, has a function of distributing a wavelength input from a single input port 101 to an arbitrary output port 102-1 through 102-4, and for example, it is installed in nodes in ring-shaped networks and mesh-shaped networks.

Here, the wavelength selection switch 100 includes: an input/output optical system having a single input port 101 and multiple output ports 102; a spectral element 120; an light-gathering optical system 130; and a mirror device 140 having multiple movable reflectors 141 arranged in a spectroscopic direction as shown in FIG. 15(a). Then, after light at multiple wavelengths input from the input port 101 is demultiplexed by the spectral element 120, demultiplexed light is concentrated to removable reflectors 141 each corresponding to one of the demultiplexed wavelengths. The reflected light is switched to an arbitrary output port 102 by means of changing the angles of the movable reflectors 141.

The input/output optical system 110 includes: a single first port (input port) 101; and multiple (here, four) second ports (output ports) 102-1 through 102-4 with a first port 101 at the end thereof within the same plane. In this instance, each of the ports 101 and 102-1 through 102-4 can be constructed so as to have a collimate means, such as a lens, for optically coupling an optical fiber individually arranged with the spectroscopic element 120.

In addition, the spectroscopic element 120 demultiplexes light input from the input optical system forming the input/output optical system 110, and it can be provided as a form of diffraction grating. Further, the light-gathering optical system 130 outputs each light component, which was demultiplexed by the spectroscopic element 120, to the movable reflectors 141 of the mirror device 140 arranged thereafter as collimated light, and it can be provided as, for example, a light-gathering lens of a permeable type or a reflection type. In this instance, in the drawing, the example shows a construction which employs a light-gathering lens of a permeable type.

Further, the mirror device 140 includes multiple movable reflectors 141 arranged in accordance with the demultiplexing direction in the spectroscopic element 120. Each of the movable reflectors 141 reflect one of the light components which is made into collimate light by the light-gathering optical system 130, and is also capable of deflecting the reflection light of each light component. Then, the light reflected by these movable reflectors 141 pass through the light-gathering optical system 130 and the spectroscopic element 120 once again, and is then introduced to the input/output optical system 110.

As a result, the wavelength selection switch 100 of FIG. 15(a) and FIG. 15(b) is constructed so as to realize mutual and bi-directional optical coupling between the first port 101 and the multiple second ports 102-1 through 102-4, which form the input/output optical system 110, through a reciprocate optical path by way of the spectroscopic element 120, the light-gathering optical system 130, and the mirror device 140, by means of setting the reflection surface angle of the above described movable reflectors 141, so that the wavelength selection switch 100 is adapted to operate as a wavelength selection switch in which paths to be optically coupled can be set by the unit of wavelength for each of the port 101, and 102-1 through 102-4, which form the input/output optical system 110.

For example, in a case where the first port 101 functions as an input port and the second ports 102-1 through 102-4 function as output ports, it is possible to selectively introduce light from the first port 101 to one of the second ports 102-1 through 102-4 through the above described reciprocate path by the unit of wavelength. In a case where the second ports 102-1 through 102-4 function as an input optical system and the first port 101 functions as an output optical system, it is possible to introduce light from the second ports 102-1 through 102-4 to the first port 101 through the above described reciprocal optical path by the unit of wavelength.

The arrangement of the movable reflectors 141 forming the mirror device 140 is generally realized by a mirror system 142 forming an MEMS (Micro Electro Mechanical Systems) mirror array. Movable mirrors as the movable reflectors 141 are arranged corresponding to wavelengths demultiplexed by the spectroscopic element 120. The movable reflectors 141 are constructed in such a manner that the tilt angles thereof are changeable. As shown in FIG. 15, it is possible to determine output ports for wavelength components in accordance with the tilt angles of the movable reflectors 141.

Further, the mirror system 142 is hermetically closed with the sapphire glass 143 in order to prohibit effects on the reflection surface of the movable reflectors 141 from change in humidity and mixture of foreign matter. That is, light passes through the sapphire glass 143 as a permeable window, thereby light being input/output to the movable reflectors 141 forming the mirror system 142.

In this instance, the sapphire glass 143 as a permeable window is a material selected from the viewpoints of mechanical strength and optical permeability. In addition, if multiple reflection occurs between the sapphire glass 143 and the movable reflectors 141, as shown in FIG. 16, it becomes crosstalk to the output ports 102. To prevent this, as shown in FIG. 15(b) and FIG. 17, for example, the sapphire glass 143 is tilted with respect to the arrangement direction of the input/output ports 101 and 102, thereby preventing the mixing of reflection light to output ports 102 other than a destination output port 102 to which light is to be introduced.

In the thus-constructed wavelength selection switch 100, which is a wavelength selection switch having the first port 101 as an input optical system and the second ports 102-1 through 102-4 as an output optical system, it is possible to switch output ports 102 which are to be output to destinations of wavelengths input from the first port 101 by means of setting the tilt angle of the mirror system 142.

Here, since the wavelength selection switch 100 as described above includes multiple elements which generate Polarization Dependent Loss (PDL) as represented by diffraction grating forming the spectroscopic element 120, it is difficult to suppress PDL in the whole of the wavelength section switch down to not larger than system specification value only by means of restraining PDL by the unit of element. Thus, as shown in FIG. 15(*a*) and FIG. 15(*b*), for example, a λ/4 wave plate 150 is arranged before the mirror device 140, thereby canceling PDL.

However, the wavelength selection switch 100 as described above is incapable of resolving a phase difference between deflections (between ordinary light and abnormal light) generated at the time light passes through the sapphire glass 143 having birefringence even though the wavelength selection switch 100 includes the λ/4 wave plate 150. In particular, the angles of light passing through the sapphire glass 143, which forms a permeable window, with respect to the sapphire glass 143 are different between light input from the first port 101 to the movable reflectors 141 and light reflected by the movable reflectors 141 to be introduced to the output ports 102, so that effects of birefringence are different between input light and output light.

Further, such effects of birefringence differ depending upon the degree of tilt of the sapphire glass 143 which is for restraining the above described cross talk. This is because the angles of input light and output light with respect to a crystal axis forming the sapphire glass 143 depend upon the tilt angle of the sapphire glass 143.

The following patent document 1 and patent document 2 describe constructions for removing effects of birefringence by means of making the angle of an input beam to the sapphire crystal in the crystal identical to the axis C of the sapphire crystal for the purpose of preventing deterioration of the efficiency of coupling to the sapphire crystal due to birefringence in a case where the sapphire crystal is similarly a permeable window in a laser module.

Further, the following patent 3 describes a construction for compensating for polarization mode dispersion by means of controlling the temperature of the crystal by providing a construction which makes the beam angle input to a birefringence crystal, such as potassium niobate, identical to the a axis direction, and makes the diffraction direction identical to the axis C and the axis b directions.

[Patent Document 1] Japanese Patent Application Laid-open No. 2005-136119

[Patent Document 2] Japanese Patent Application Laid-open No. HEI 8-148594

[Patent Document 3] Japanese Patent Application Laid-open No. 2003-43418

However, the above patent documents 1 through 3 propose effects of birefringence onto only a single beam, and they do not propose a construction for suppressing PDL on the assumption of multiple modes of angles with respect to the crystal axis of the sapphire glass at the time input light and output light to movable mirrors pass through the sapphire glass which forms a permeable window.

For example, the above described wavelength switch has a feature such that a beam input from a single input port 101 is coupled to one arbitrary port, out of the multiple output ports 102, or that a beam from an arbitrary one of the beams from multiple input ports is coupled to one output port by means of changing the angle of the removable mirror, so that consideration must be paid to effects of birefringence of multiple beams at the same time.

More specifically, as shown in FIG. 18, a construction is assumed which has a single input port (port #0) 101 and four output ports (port #1 through port #4) 102. At that time, following the technology described in the patent document 1 and the patent document 2, it is considerable that the optical axis AX0 which is made by light from the port #0 within the crystal is made to be identical to the direction AXC of the axis C which is the crystal axis of the sapphire glass 143, in order to suppress PDL of light from the port #0, as shown in FIG. 18.

However, PDL of a beam output from each port #1 through #4 depends upon the sum of phase differences which are given to a beam input from the port #0 and beams from output ports #1 through #4 by birefringence within the sapphire glass 143. Accordingly, as shown in this FIG. 18, even if the light axis AX0 formed by the light from the port #0 is made to be identical to the axis C direction AXC, which is the crystal axis of the sapphire glass 143, in order to suppress PDL of the light from the port #0, beams respectively returning to output ports #1 through #4 after being reflected by the movable mirror 142 always deviate from the axis C direction AXC of the sapphire glass 143, so that PDL is resultantly increased.

As an example, when PDL is calculated from a phase difference due to birefringence by use of Jones vector, in a case where PDL of 1 dB initially exists in a diffraction grating or the like, for example, the thickness of the sapphire glass 143, as a permeable window, of 1 mm and the angle difference of 10° within the sapphire glass 143 made between the port #0 and the port #4 makes a 0.71 dB of PDL remained even if the λ/4 wave plate 150 is arranged. Although it is desirable that PDL should be restrained down to approximately 0.4 dB as a matter of system design of the wavelength selection switch, such a construction significantly exceeds this value.

SUMMARY OF THE INVENTION

With the foregoing problems in view, one object of the present invention is to suppress PDL on the assumption of multiple modes of angles with respect to the crystal axis of the crystal member which input light and output light to a removable mirror pass through at the time such light passes through the crystal member.

In this instance, not being limited to the above object, one of other objects of the present invention is to produce effects introduced by each construction described in the best embodiment of the present invention which will be described later, which cannot be obtained by the previous art.

In order to accomplish the above objects, the present invention featured in the following mirror device and optical apparatus.

(1) As a generic feature, there provided is a mirror device with a mirror system having (i) a movable mirror which reflects incoming light and is capable of switching the direction of the reflect light by a reflect surface angle and (ii) a flat-shaped crystal member which is provided for the mirror system in a united form and lets incoming light from outside pass therethrough to let the light enter a reflect surface of the movable mirror and lets light reflected by the movable mirror pass therethrough to output the light outside as output light, in which mirror device it is possible to combine light bi-directionally and mutually, via the movable mirror whose reflect surface angle is switchable and the crystal member, between a single first optical path and a plurality of second optical paths arranged on the same plane as that of the first optical path with the first optical path at the end thereof, wherein the crystal member is arranged in such a manner that a first angle is not larger than a second angle, the first angle and the second angle being defined as angles made by the crystal member with respect to the first optical path and one of the second optical paths, respectively, which are a pair of paths in which, out of the first optical path and the second optical paths, an input angle and an output angle to the movable mirror become the maximum at the both sides thereof by means of switching the reflect surface angle of the movable mirror, and wherein the crystal member is constructed in such a manner that a third angle is substantially equal to a half of a fourth angle, the third angle being defined as an angle made between the first optical path and axis C of the crystal member, and the fourth angle being an angle made between the first optical path and the second optical path, which is made of the pair of optical paths passing through the crystal member in which an input angle and an output angle to the movable mirror become the maximum at the both end thereof by means of switching the reflect surface angle of the movable mirror.

(2) As another generic feature, there provided is a mirror device with a mirror system having (i) a movable mirror which reflects incoming light and is capable of switching the direction of the reflect light by a reflect surface angle and (ii) a flat-shaped crystal member which is provided for the mirror system in a united form and lets incoming light from outside pass therethrough to let the light enter a reflect surface of the movable mirror and lets light reflected by the movable mirror pass therethrough to output the light outside as output light, in which mirror device it is possible to combine light bi-directionally and mutually, via the movable mirror whose reflect surface angle is switchable and the crystal member, between a single first optical path and a plurality of second optical paths arranged on the same plane as that of the first optical path with the first optical path at the end thereof, wherein the crystal member is arranged in such a manner that the first angle is larger than the second angle, the first angle and the second angle being defined as angles made by the crystal member with respect to the first optical path and one of the second optical paths, respectively, which are a pair of paths in which, out of the first optical path and the second optical paths, an input angle and an output angle to the movable mirror become the maximum at the both sides thereof by means of switching a reflect surface angle of the movable mirror, and wherein the crystal member is constructed in such a manner that a third angle is substantially equal to the sum between a half of a fourth angle and a correction value of a change in optical thickness of light incoming to the movable mirror and light output from the movable mirror in the crystal member, the third angle being defined as an angle made between the first optical path and axis C of the crystal member, and the fourth angle being defined as an angle made by a pair of optical paths, which are the first optical path and the single second optical path in which light passes through the crystal member and in which an input angle and an output angle become the maximum at the both end thereof by means of switching of a reflect surface angle of the movable mirror.

(3) As a preferred feature, in the above description (2), the correction value is a value obtained by multiplying a fifth angle by a constant, the fifth angle being a value obtained by subtracting the first angle from a half of the fourth angle.

(4) As another preferred feature, in the above description (3), the constant is determined from the amount of birefringence of the crystal member and the fourth angle.

(5) As yet another preferred feature, in the above description (1), the first optical path is an input optical path to the movable mirror, and the second optical path is an output optical path from the movable mirror.

(6) As still another preferred feature, in the above description (2), the first optical path is an input optical path to the movable mirror, and the second optical path is an output optical path from the movable mirror.

(7) As a further preferred feature, the second optical path is an input optical path to the movable mirror, and the first optical path is an output optical path from the movable mirror.

(8) As a yet further preferred feature, in the above description (2), the second optical path is an input optical path to the movable mirror, and the first optical path is an output optical path from the movable mirror.

(9) As a still further preferred feature, in the above description (1), the crystal member is a sapphire crystal.

(10) As another preferred feature, in the above description (2), the crystal member is a sapphire crystal.

(11) As yet another generic feature, the provided is an optical apparatus including: an input/output optical system having a single first port and a plurality of second ports arranged on the same plane as that of the first port with the first port at the end thereof; a spectroscopic element which separates light input from the input/output optical system; a light-gathering optical system which makes each optical component separated by the spectroscopic element into coherent light; and a mirror device having a plurality of movable mirrors which are operable to deflect each optical component from the light-gathering optical system by reflection, which optical apparatus is constructed in such a manner that the first port and the plurality of second ports which form the input/output optical system are adapted to be optically combined mutually and bi-directionally through a reciprocative optical path via the spectroscopic element, the light-gathering optical system, and the mirror device, the mirror device including: a mirror system having the plurality of movable mirrors which are arranged in the spectroscopic direction of the spectroscopic element to reflect each optical components from the light-gathering optical system as incoming light and are capable of switching the direction of the reflected light by reflect surface angles thereof; and a flat-shaped crystal member which is provided for the mirror system in a united form and lets light reflected by the movable mirrors pass therethrough to output the light to the light-gathering optical system as output light, in which mirror device it is possible to combine light bi-directionally and mutually, via the movable mirror whose reflect surface angle is switchable and the crystal member, between a single first optical path connected to the first port and a plurality of second optical paths connected to the second ports via the light-gathering optical system and the spectroscopic element arranged on the same plane as that of the first optical path with the first optical path at the end thereof, wherein crystal member is arranged in such a manner that a first angle is not larger than a second angle, the first angle and the second angle being defined as angles made by the crystal member with respect to the first optical path and one of the second optical paths, which are a pair of paths in which, out of the first optical path and the second optical paths, an input angle and an output angle to the movable mirror become the maximum at the both sides thereof by means of switching a reflect surface angle of the movable mirror, and wherein the crystal member is constructed in such a manner that a third angle is substantially equal to a half of a fourth angle, the third angle being defined as an angle made between the first optical path and axis C of the crystal member, and the fourth angle being defined as an angle made between the first optical path and the single second optical path, which is made by a pair of optical paths passing through the crystal member in which an input angle and an output angle to the movable mirror become the maximum at the both sides thereof by means of switching a reflect surface angle of the movable mirror.

(12) As a still generic feature, there provided is an optical apparatus including: an input/output optical system having a single first port and a plurality of second ports arranged on the same plane as that of the first port with the first port at the end thereof; a spectroscopic element which separates light input from the input/output optical system; a light-gathering optical system which makes each optical component separated by the spectroscopic element into coherent light; and a mirror device having a plurality of movable mirrors which are operable to deflect each optical component from the light-gathering optical system by reflection, which optical apparatus is constructed in such a manner that the first port which forms the input/output optical system and the plurality of second ports are adapted to be optically combined mutually and bi-directionally through a reciprocative optical path via the spectroscopic element, a light-gathering optical system, and the mirror device, the mirror device including: a mirror system having the plurality of movable mirrors which are arranged in a spectroscopic direction and reflect each optical component from the light-gathering optical system as incoming light and are operable to switch the directions of the reflected light by reflection surface angles thereof; and a flat-shaped crystal member which is provided for the mirror system in a united form and lets incoming light from the light-gathering optical system pass therethrough to enter the reflect surface of the movable mirror, and lets the light reflected by the movable mirrors pass therethrough to output the light to the light-gathering optical system as output light, in which mirror device it is possible to combine light bi-directionally and mutually, via the movable mirror whose reflect surface angle is switchable and the crystal member, between a single first optical path connected to the first port via the light-gathering optical system and the spectroscopic element and a plurality of second optical paths connected to the second port via the light-gathering optical system and the spectroscopic element arranged on the same plane as that of the first optical path with the first optical path at the end thereof, wherein the crystal member is arranged in such a manner that a first angle is larger than a second angle, the first angle and the second angle being defined as angles made by the crystal member with respect to the first optical path and one of the second optical paths, respectively, which are a pair of paths in which, out of the first optical path and the second optical paths, an input angle and an output angle to the movable mirror become the maximum at the both sides thereof by means of switching a reflect surface angle of the movable mirror, and wherein the crystal member is constructed in such a manner that a third angle is substantially equal to the sum between a half of a fourth angle and a correction value of a change in optical thickness of light incoming to the movable mirror and light output from the movable mirror in the crystal member, the third angle being defined as an angle made between the first optical path and axis C of the crystal member, and the fourth angle being defined as an angle made by a pair of optical paths passing through the crystal member, which are the first optical path and one of the second optical path and in which an input angle and an output angle become the maximum at the both sides thereof by means of switching of a reflect surface angle of the movable mirror.

(13) As a preferred feature, in the above description (11), the first port corresponding to the first optical path works as an input port, and the second port corresponding to the second optical path works as an output port, by means of constructing the first optical path as an input optical port to the movable mirror and the second optical path as an output optical port from the movable mirror, thereby the optical apparatus being adapted to selectively switch light input through the first port to any of the second port by the unit of wavelength by means of switching the reflect surface angles of the plurality of movable mirrors.

(14) As another preferred feature, in the above description (12), the first port corresponding to the first optical path works as an input port, and the second port corresponding to the second optical path works as an output port, by means of constructing the first optical path as an input optical port to the movable mirror and the second optical path as an output optical port from the movable mirror, thereby the optical apparatus being adapted to selectively switch light input through the first port to any of the second port by the unit of wavelength by means of switching the reflect surface angles of the plurality of movable mirrors.

(15) As yet another preferred feature, in the above description (11), the second port corresponding to the second optical path works as an input port, and the first port corresponding to the first optical path works as an output port, by means of constructing the second optical path as an input optical path to the movable mirror and the first optical path as an output optical path from the movable mirror, thereby the optical apparatus being adapted to selectively switch light input through the second port to any of the first port by the unit of wavelength by means of switching the reflect surface angles of the plurality of movable mirrors.

(16) As still another preferred feature, in the above description (12), the second port corresponding to the second optical path works as an input port, and the first port corresponding to the first optical path works as an output port, by means of constructing the second optical path as an input optical path to the movable mirror and the first optical path as an output optical path from the movable mirror, thereby the optical apparatus being adapted to selectively switch light input through the second port to any of the first port by the unit of wavelength by means of switching the reflect surface angles of the plurality of movable mirrors.

(17) As a further preferred feature, in the above description (11), the spectroscopic element is made of a plurality of sheets of diffraction grating arranged tandem.

(18) As another further preferred feature, in the above description (12), the spectroscopic element is made of a plurality of sheets of diffraction grating arranged tandem.

(19) As a yet another further preferred feature, in the above description (11), a pair of prisms is interposed between the input/output optical system and the spectroscopic element.

(20) As a still further preferred feature, in the above description (12), a pair of prisms is interposed between the input/output optical system and the spectroscopic element.

(21) As another preferred feature, in the above description (11), a $\lambda/4$ wave plate is interposed between the light-gathering optical system and the mirror device.

(22) As yet another preferred feature, in the above description (12), a $\lambda/4$ wave plate is interposed between the light-gathering optical system and the mirror device.

In this manner, according to the present invention, it is possible to minimize PDL by means of setting the crystal axis direction of a crystal member itself with respect to the angle of input/output light, in accordance with the tilt angle setting to input/output light.

Other objects and further features of the present invention will be apparent from the following detailed description when read in conjunction with the relevant accompanying drawings.

BRIEF DESCRIPTION OF THE DRAWINGS

FIG. 15(*a*) and FIG. 15(*b*) each are conceptual diagrams of an optical apparatus which operates as a common wavelength selective switch;

FIG. 16 is a diagram for describing generation of crosstalk in a wavelength selective switch;

FIG. 17 is a diagram for describing a construction for restraining generation of cornstalk in a wavelength selective switch.

DESCRIPTION OF THE PREFERRED EMBODIMENT(S)

Hereinafter, one preferred embodiment of the present invention will be described with reference to the relevant accompanying drawings.

In this instance, the present invention should by no means be limited to the following embodiment. Further, the following disclosure of the present embodiment also clarifies not only the above described objects of the present invention but also other technological issues, means for resolving the issues, and effects and benefits of the present invention.

Figure 1:
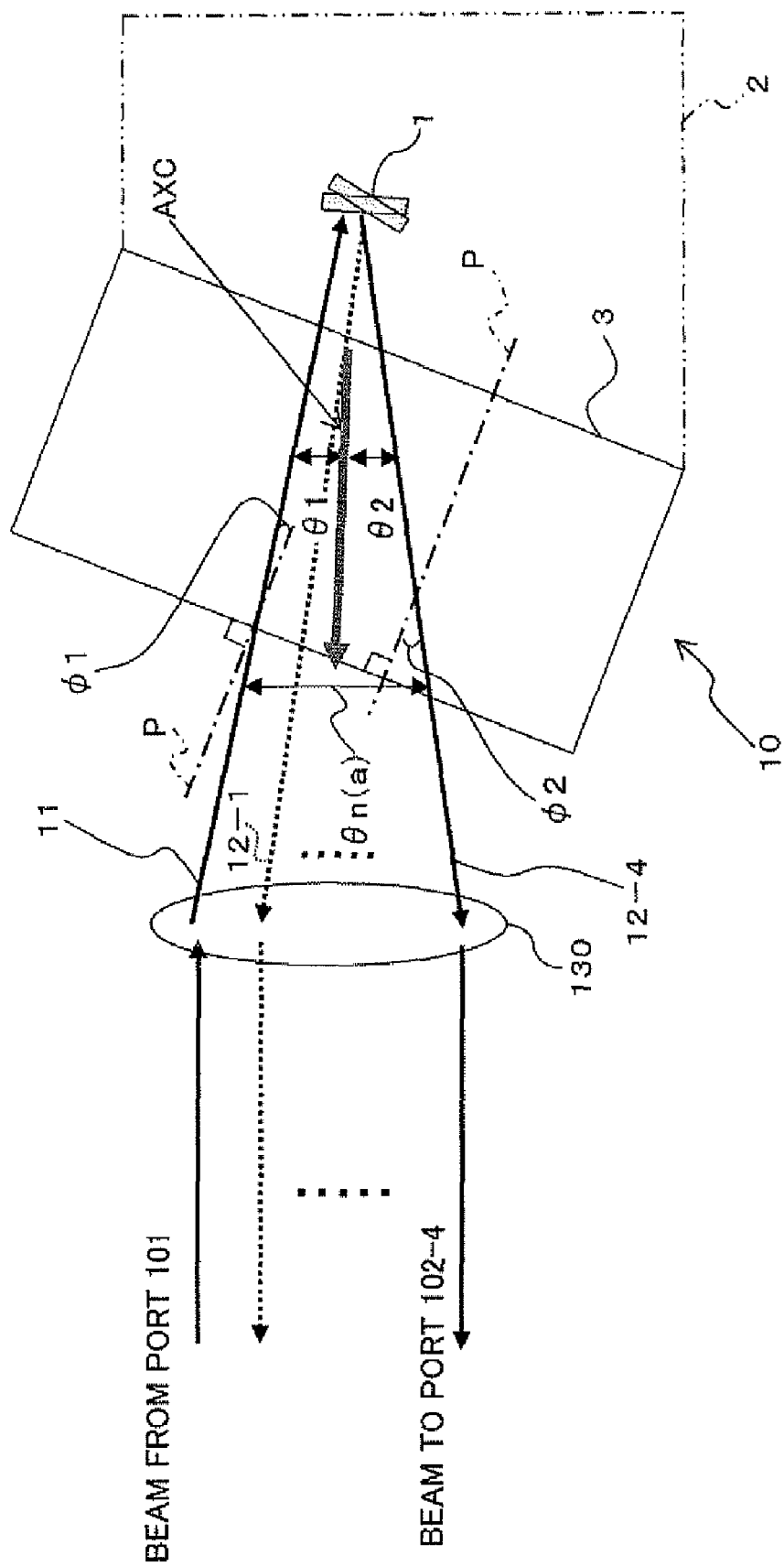
FIG. 1 is a diagram illustrating a mirror device according to one preferred embodiment of the present invention.

[A] Construction of Mirror Device 10 according to the Present Embodiment:

FIG. 1 is a diagram illustrating a mirror device according to the present embodiment. The mirror device 10 can be applied instead of the mirror device 140 of the optical apparatus 100 which is the wavelength selective switch illustrated in FIG. 15(*a*) and FIG. 15(*b*) whose description was already made. In this instance, FIG. 1 omits illustration of an input/output optical system 110, a spectral element 120, and a λ/4 wave plate 150.

Here, the mirror device 10 includes: a mirror system 2 having a movable mirror 1 which reflects incoming light from the light-gathering optical system 130 [see FIG. 15(*a*) and FIG. 15(*b*)] and is capable of switching the direction of light reflected to a light-gathering optical system 130 by means of the angle of the reflection surface of the movable mirror 1; and a flat-shaped sapphire crystal 3, provided for the mirror system 2 in an united form, which lets incoming light from outside pass therethrough to let the light enter the reflect surface of the movable mirror 1 and which lets light reflected by the movable mirror therethrough to let the light output outside as output light.

The movable mirror 1 is given as an MEMS mirror. When it is applied to the wavelength selection switch 100, multiple movable mirrors 1 can be provided in the demultiplexing directions in the spectral element 120 in accordance with wavelength components which correspond to the unit of light to be reflected. The mirror system 2 has a mechanism for supporting the movable mirror 1 in a freely rotatable manner together with a mechanism for setting the angle of the refection surface of the above described movable mirror 1 by activation thereof, and is constructed as, for example, an MEMS mirror array. Further, the sapphire crystal 3 closes the mirror system 2 in a hermetic manner to restrain effects on the reflect surface of the movable mirror 1 due to humidity change and mixture of extraneous materials.

Still further, a first optical path 11 is an optical path between the light-gathering optical system 130 and the movable mirror 1 which are optically connected to a first port 101, which is an input port which is not illustrated in the drawing, by way of the spectral element 120 and the light-gathering optical system 130. Furthermore, second optical paths 12-1 through 12-4 each are optical paths between the light-gathering optical system 130 and the movable mirror 1 which are optically coupled to second ports 102-1 through 102-4, which are output ports which are not illustrated in the drawing, by way of the spectral element 120 and the light-gathering optical system 130 by means of setting the angle of the movable mirror 1 [see FIG. 15(*b*)].

Furthermore, the above described first optical path 11 and the second optical paths 12-1 through 12-4 have a positional relationship which spreads radially with the movable mirror 1 as a reference point in the same wavelength components which is wavelength-separated by the spectral element 120. Then, the second optical paths 12-1 through 12-4 are sequentially arranged in the above-mentioned radial manner with the first optical path 11 arranged at the end thereof.

Hereby, as shown in FIG. 1, the above can make it possible to couple light bi-directionally and mutually among the multiple (here, four) second optical paths 12-1 through 12-4 with the first optical path 11 arranged at the end thereof in a single first optical path 11 in a plane the same as that of the first optical path 11, by way of the movable mirror 1 whose reflect surface angle is switchable and the sapphire crystal 3.

That is, when the mirror device 10 is applied as a mirror apparatus (see reference character 140) shown in FIG. 15, as illustrated in FIG. 15(*b*), assuming that the first port 101 is an input port and the second ports 102-1 through 102-4 are output ports, it is possible to selectively introduce light from the first port 101 to the unit of wavelength, by means of setting the reflect surface angle of the movable mirror 1 forming the mirror device 10, to any one of the second ports 102-1 through 102-4, On the other hand, in a case of assuming that the second ports 102-1 through 102-4 are input ports and the first port 101 is an output port, it is possible to introduce light from the second ports 102-1 through 102-4 to the first port 101 by the unit of wavelength, by means of setting the reflect surface angle of the movable mirror 1 forming the mirror device 10.

[B] Arrangement of Crystal Member 3 and Arrangement of the Crystal Axis:

Here, in the mirror device 10 of the present embodiment, the sapphire crystal 3, which hermetically closes the mirror system 2, has the tilt arrangement and the arrangement of the crystal axis with respect to the arrangement direction of the ports 101, and 102-1 through 102-4 (or the radiative direction formed by the first optical path 11 and the second optical paths 12-1 through 12-4), so that it is possible to minimize PDL generated by input/output to the movable mirror 1. In this instance, a description will be made with an attention paid, for convenience of description, to a case where the mirror device 10 is replaced by the mirror device 140 in the wavelength selective switch 100 and where, in particular, the first port 101 is given as an input port and the second ports 102-1 through 102-4 are given as output ports.

First of all, in a case where an input beam is input to the movable mirror 1 through the first optical path 11 and is output as an output beam through any one of the second optical path 12-i (i=integers of 1 through 4), a derivation formula as to birefringence at the time such input/output beams pass through the sapphire crystal 3 is established. Next, by use of the derived derivation formula of birefringence, a formula for deriving a phase difference Δx between ordinary light and abnormal light generated by this birefringence is established.

Here, as shown in FIG. 1, the angle, in the movable mirror 1, made between an input beam (a beam that tracks the first optical path 11) and an output beam (a beam that tracks the second optical path 12-i) is given as "θn"; an angle, in the sapphire crystal 3, between an input beam and axis C AXC, that is, an angle, in the crystal, made between the first optical path 11 and axis C AXC, is given as "θ1"; an angle, in the crystal, made between an output beam and sapphire crystal axis C AXC, that is, an angle made between the second optical path 12-i and the axis C AXC, is given as "θ2"; an ordinary beam component refractive index is given as "no"; and an abnormal beam refractive index is given as "ne".

At that time, birefringence Δn1, generated in the sapphire crystal 3, of light which tracks the first optical path 11 and enters the movable mirror 1, is given by the following formula (1), and birefringence Δn2, generated in the sapphire crystal 3, of light which is reflected by the movable mirror 1 and tracks the second optical path 12-i, is given by the following formula (2).

$$\Delta n1 = no - \frac{ne\,no}{\sqrt{(ne\,\text{Cos}[\theta 1])^2 + (no\,\text{Sin}[\theta 1])^2}} \quad (1)$$

$$\Delta n2 = no - \frac{ne\,no}{\sqrt{(ne\,\text{Cos}[\theta 2])^2 + (no\,\text{Sin}[\theta 2])^2}} \quad (2)$$

Here, as already described with reference to FIG. 16, if the sapphire crystal 3 is not tilted with respect to the arrangement directions of the first and the second port 101, and 102-1 through 102-4, light which is reflected on the back surface of the sapphire glass 143 (the surface facing the movable reflector 141) is reflected once again on the movable reflector 141, so that it becomes crosstalk to the output ports 102-1 through 102-4 which is not to be expected. In order to suppress the occurrence of such crosstalk, as shown in FIG. 17, for example, the sapphire glass 143 is tilted with respect to the port arrangement direction. However, as the tilt angle becomes larger, the occurrence of crosstalk is more efficiently restrained, so that a necessary effective diameter and difficulties in manufacturing a reflection suppressing film are increased, thereby bringing about enlarging of costs. Hence, the minimum tilt angle necessary for crosstalk countermeasure is obtained, and this angle is set as a tilt angle of the sapphire glass 143. The tilt angle necessary here depends on the design conditions of the optical system such as a crosstalk permissive capacity for use of the system, a lens focus forming the light-gathering optical system 130, a distance from the movable reflector 141 to the sapphire glass 143, parameters of port arrangement, and etc., but a range of 10° through 40° is commonly selected.

Likewise, in the mirror device 10 shown in FIG. 1, to restrain such an occurrence of crosstalk and system design conditions are attempted to be balanced to select a necessary tilt angle. This tilt angle is derived substantially uniquely due to the design conditions of an object optical system as described above.

As shown in FIG. 1, it is assumed that an angle made between the vertical direction P with respect to the permeable surface of the sapphire crystal 3 and a direction made by an input beam tracking the first optical path 11 in the sapphire crystal 3, is given as a first angle Φ1, and an angle to the direction which is made by a beam from the second optical path 12-4, which is the most distant from the first optical path 11, in the sapphire crystal 3 is given as second angle Φ1. In that case, these Φ1 and Φ2 can be coped with as constants, since they are substantially corresponding to the tilt angle uniquely derived as already described above. At that time, the above described phase difference due to birefringence in which a deriving formula is established by the formula (1) and formula (2) can be expressed by the following formula (3). In this instance, in the formula (3), "t" represents the thickness of the sapphire crystal 3.

$$\Delta x = \frac{t}{\text{Cos}[\phi 1]}\left(no - \frac{ne\,no}{\sqrt{(ne\,\text{Cos}[\theta 1])^2 + (no\,\text{Sin}[\theta 1])^2}}\right) + \quad (3)$$
$$\frac{t}{\text{Cos}[\theta n - \phi 1]}\left(no - \frac{ne\,no}{\sqrt{(ne\,\text{Cos}[\theta n - \theta 1])^2 + (no\,\text{Sin}[\theta n - \theta 1])^2}}\right)$$

Since the second optical paths 12-1 through 12-4 are sequentially arranged in a radial manner, with the first optical path 11 at the end thereof, it can be said that θn and θ1 are within a range of 90°≧θn≧θ1. Here, the smaller the Δx, the smaller the PDL of the path from the first optical path 11 to the second optical path 12-i.

Figure 2:
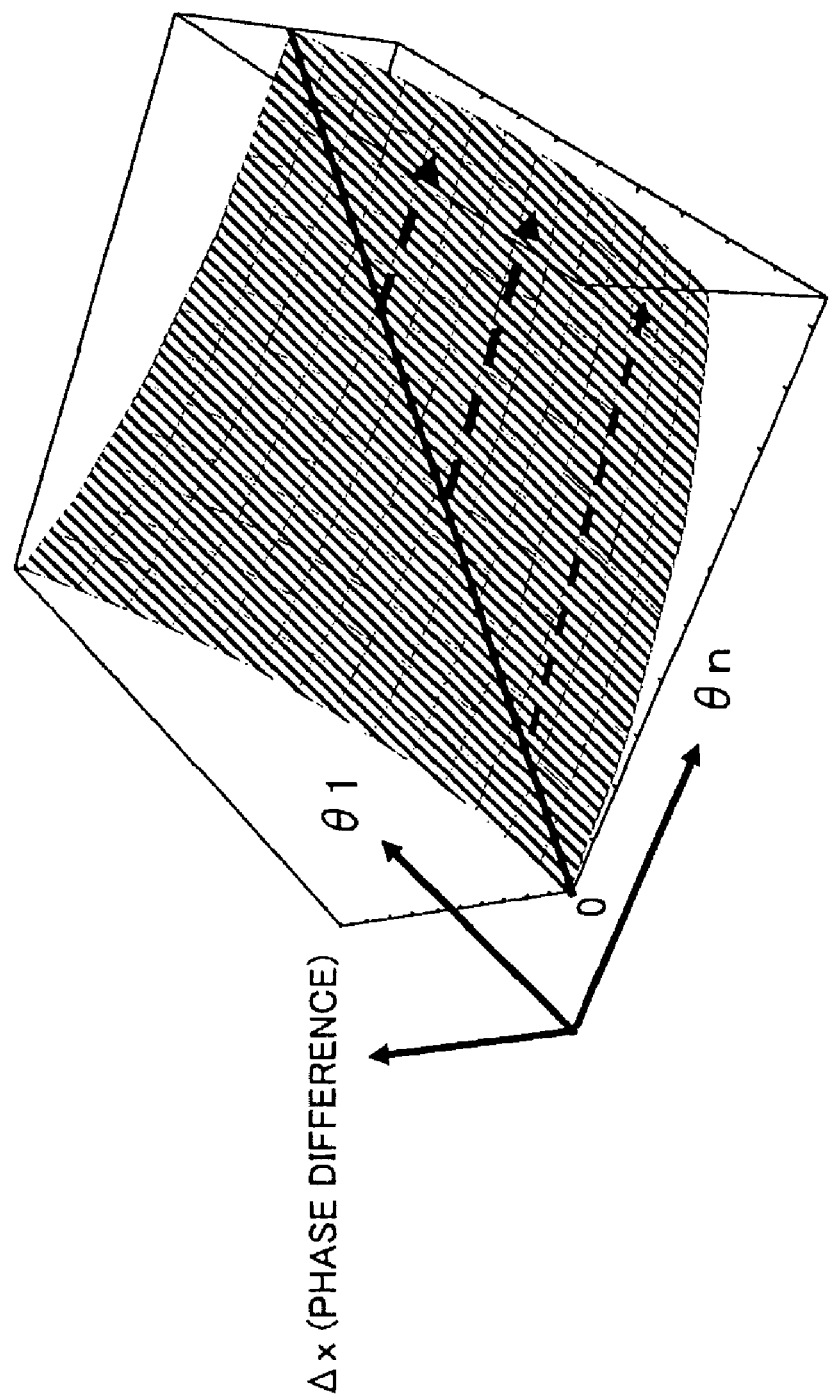
FIG. 2 is a diagram showing three-dimensional graph assuming that formula (3), which derivates a phase difference due to birefringence, is a two variable function of θn and θ1 according to the present embodiment.

When it is assumed that the mirror device 10 is applied as a construction element of a wavelength selection switch, the specification of PDL in the system is commonly defined to be the maximum value. Therefore, first of all, consideration is paid to a case in which PDL becomes the maximum when a beam from the first optical path 11 returns to a certain second optical path 12-i. FIG. 2 shows a three-dimensional graph obtained when the formula (3) is regarded as a two variable function of θn and θ1.

On the basis of this FIG. 2, Δx can be considered to always be an increasing function with respect to θn (see the arrow in FIG. 2). Here, "a" is defined to be an angle (that is, a≧θn) made between the first optical path 11 and a single second optical path 12-4 which realizes a pair of optical paths where an input angle and an output angle to the movable mirror 1 are largest at the both sides thereof by means of switching the reflect surface angle of the movable mirror 1. At that time, Δx becomes the maximum when θn=a, that is, in a case of from the first optical path 11 to the second optical path 12-4. In this instance, FIG. 2 is on the assumption of Φ1=θ2. In a case of Φ1≠Φ2, likewise, Δx can be considered to always be an increasing function with respect to θn, and it can be hypothesized that Δx becomes the maximum in a case of from the first optical path 11 to the second optical path 12-4.

This makes it possible to obtain θ1 which makes Δx the smallest in a case of a path from the first optical path 11 to the second optical path 12-4. Hence, assuming θ1=a, as shown in the following formula (4), Δx can be regarded to be a one variable function of θ1. Further, when the formula (4) is differentiated for θ1, the following formula (5) can be obtained.

$$Ax = \frac{t}{\text{Cos}[\phi 1]}\left(no - \frac{ne\,no}{\sqrt{(ne\,\text{Cos}[\theta 1])^2 + (no\,\text{Sin}[\theta 1])^2}}\right) + \quad (4)$$
$$\frac{t}{\text{Cos}[a - \phi 1]}\left(no - \frac{ne\,no}{\sqrt{(ne\,\text{Cos}[a-\theta 1])^2 + (no\,\text{Sin}[a-\theta 1])^2}}\right)$$

$$\frac{d\Delta x}{d\theta 1} = \frac{1}{2}\cdot ne\cdot no\cdot t\left(\frac{2\sqrt{2}\,(ne^2 - no^2)\sec[a-\theta 1]\sin[2(a-\theta 1)]}{(ne^2 + no^2 + (ne^2 - no^2)\cos[2(a-\theta 1)])^{3/2}} + \quad (5)\right.$$
$$\left.\frac{2(-ne^2 + no^2)\cos[\theta 1]\sec[\theta 1]\sin[\theta 1]}{(ne^2\cos[\theta 1]^2 + no^2\sin[\theta 1]^2)^{3/2}}\right)$$

Figure 3:
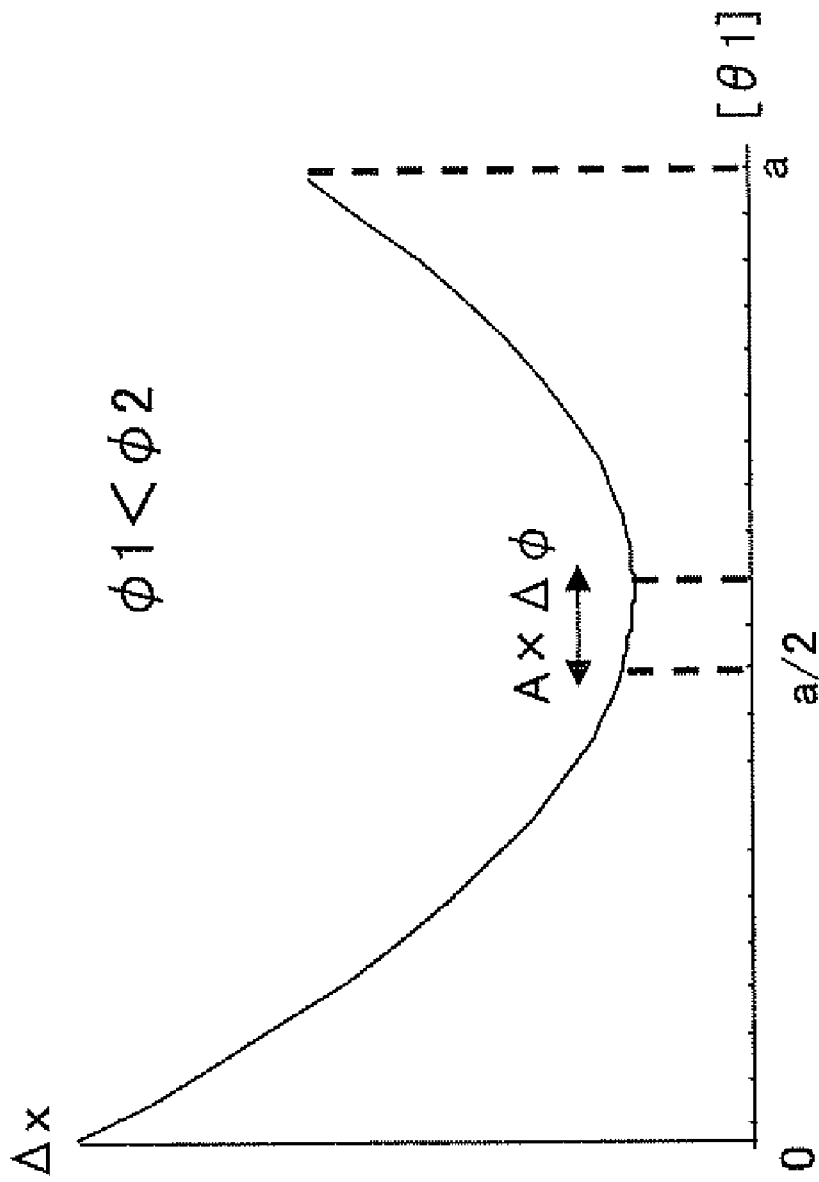
FIG. 3 is a diagram showing the graph of formula (4) according to the present embodiment.
Figure 4:
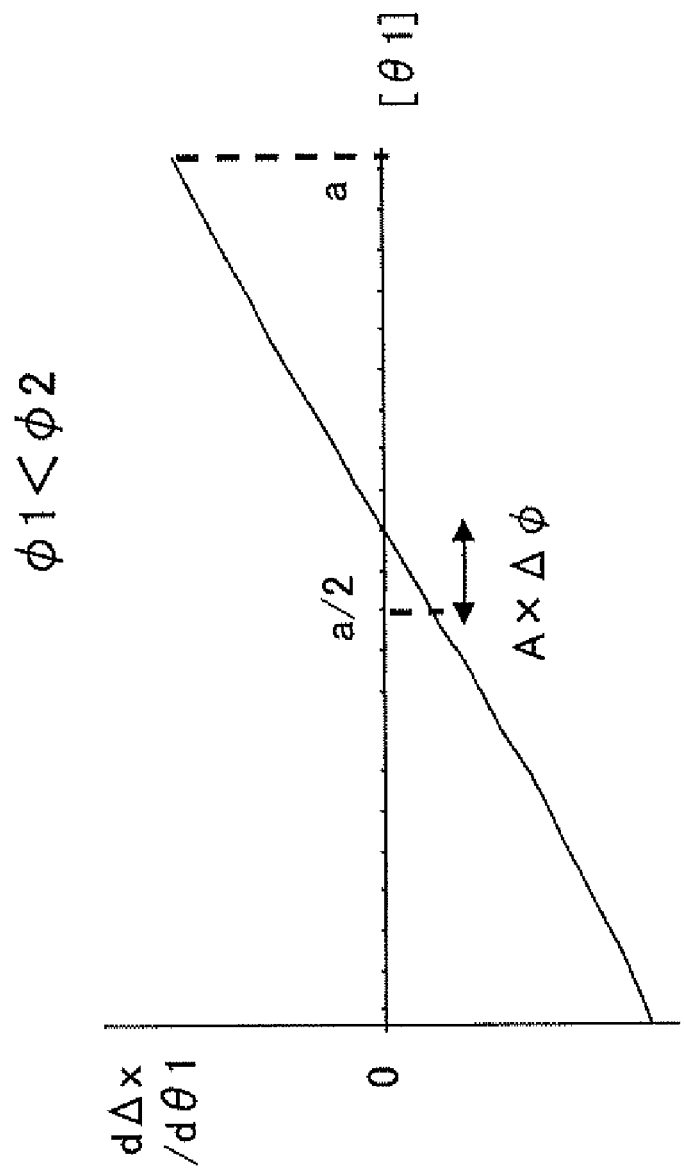
FIG. 4 is a diagram showing the graph of formula (5) according to the present embodiment.

In a case where Φ1<Φ2, for example, the graphs of the formula (4) and the formula (5) are those which are shown in FIG. 3 and FIG. 4, respectively. In this case, since θ1 can be regarded as a function with a constant increasing rate having an extremely small value within the range, this extremely small value can be considered to be the value of θ1 where Δx takes the minimum value when θ1=a. In a case where a magnitude relationship between Φ1 and Φ2 shows another condition made, also, the extremely small value obtained in a similar manner is the value of θ1 which minimizes Δx.

Here, assuming that a/2−Φ1 is ΔΦ1 as the fifth angle, θ1 when it takes the Δx minimum value at the time θn=a by means of resolving the equation (by means of obtaining the extremely small value) assuming the formula (5)=0, is a/2+A×ΔΦ1. A×ΔΦ1 at this time is a term of the correction value which corrects change in the optical thickness of an input beam and an output beam. "A" is an angle made between the birefringence amount of the crystal and input/output beams in the crystal, that is, "A" is a constant determined from "no", "ne", and "a".

On the basis of the results to this point, when one path in which a beam tracking the first optical path 11 returns to one second optical path 12-i is taken into account, PDL of a path (where θn=a) to the second optical path 12-4 which is the most distant from the first optical path 11 becomes the maximum. At that time, assuming that θ1=a/2+A×ΔΦ1, regardless of a tilt angle direction of the sapphire crystal 3 (regardless of the magnitude relationship between Φ1 and Φ2), it becomes possible to make Δx be the minimum (that is, make PDL the minimum).

Next, in order to verify whether θ1, obtained assuming that θ1=a as described above, is capable of making Δx the minimum when it takes another value as θn, the value of θn which makes PDL the minimum by means of converting a variable into θn by use of the value of θ1 obtained as described above.

That is, from the deriving formula of Δx generating in a beam which tracks a path from the first optical path 11 to other second optical paths 12-1 through 12-3 (in this case, θn<a) other than the second optical path 12-4, θn which makes Δx the minimum is derived. That is, assuming that θ1=a/2+A×ΔΦ1, the formula (3) which derives Δx can be made into a single variable function of θn as shown in the formula (6).

$$Ax = \frac{t}{\text{Cos}[\phi 1]}\left(no - \frac{ne\,no}{\sqrt{(ne\,\text{Cos}[a/2-(A\times\Delta\phi 1)])^2 + (no\,\text{Sin}[a/2-(A\times\Delta\phi 1)])^2}}\right) + \quad (6)$$
$$\frac{t}{\text{Cos}[\theta n - \phi 1]}\left(no - \frac{ne\,no}{\sqrt{(ne\,\text{Cos}[\theta n-(a/2-A\times\Delta\phi 1)])^2 + (no\,\text{Sin}[\theta n-(a/2-A\times\Delta\phi 1)])^2}}\right)$$

Figure 5:
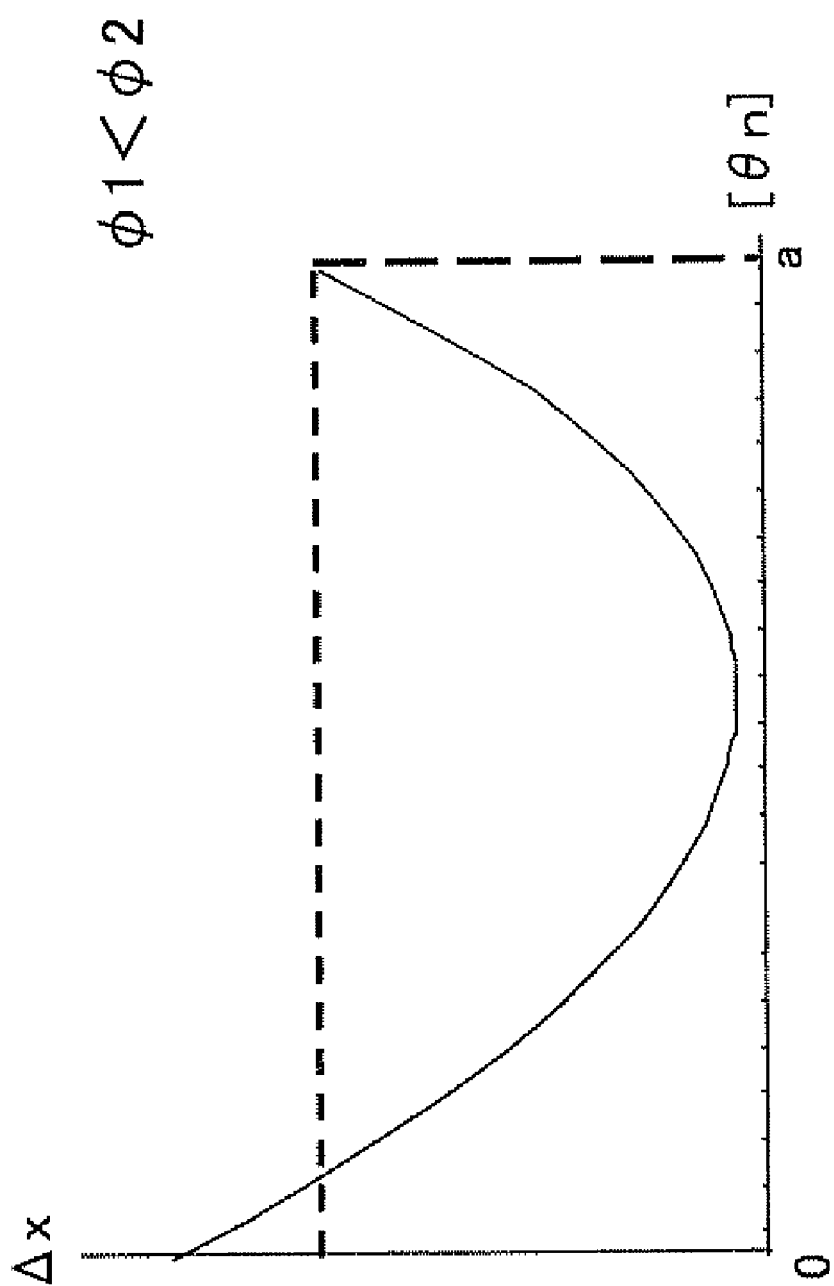
FIG. 5 is a diagram showing the graph of a phase difference in a case where Φ1<Φ2 within a range of 0≦θn≦a on the basis of formula (6) according to the present embodiment.
Figure 6:
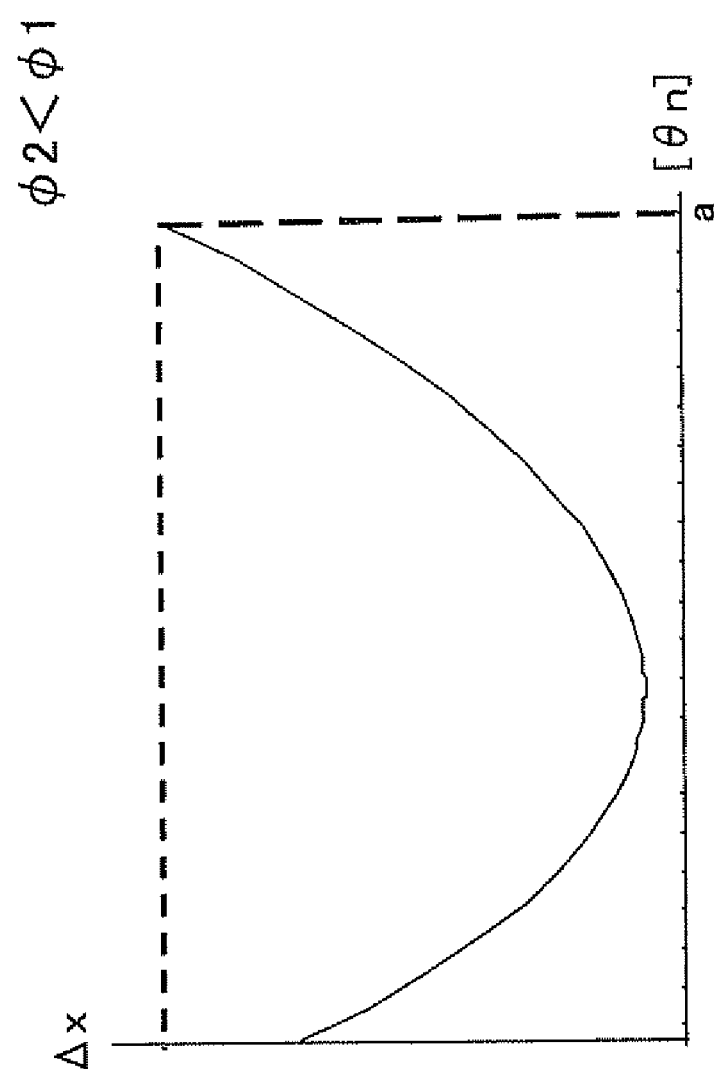
FIG. 6 is a diagram showing the graph of a phase difference in a case where Φ1<Φ2 within a range of 0≦θn≦a on the basis of formula (6) according to the present embodiment.

At that time, on the basis of the formula (6), the graphs of Δx when Φ1<Φ2 and Φ2<Φ1 within a range of 0≦θn≦a are shown in FIG. 5 and FIG. 6, respectively.

Here, when Φ1>θ2, a phase difference when θn=a within a range of 0≦θn≦a becomes the maximum as shown in FIG. 6. Thus, PDL as the whole of the mirror device 10 becomes the minimum when θ1=a/2+A×ΔΦ1 so that it is possible to say that the conclusion of the above-described hypothesis is correct.

In contrast, when Φ1<Φ2, at ports close to θn=0, a phase difference when θ1=a is exceeded, as shown in FIG. 5, a construction in which PDL becomes the minimum when θ1=a/2+A×ΔΦ1 is not realized, so that it is impossible to say that the conclusion of the above-described hypothesis is correct.

Figure 7:
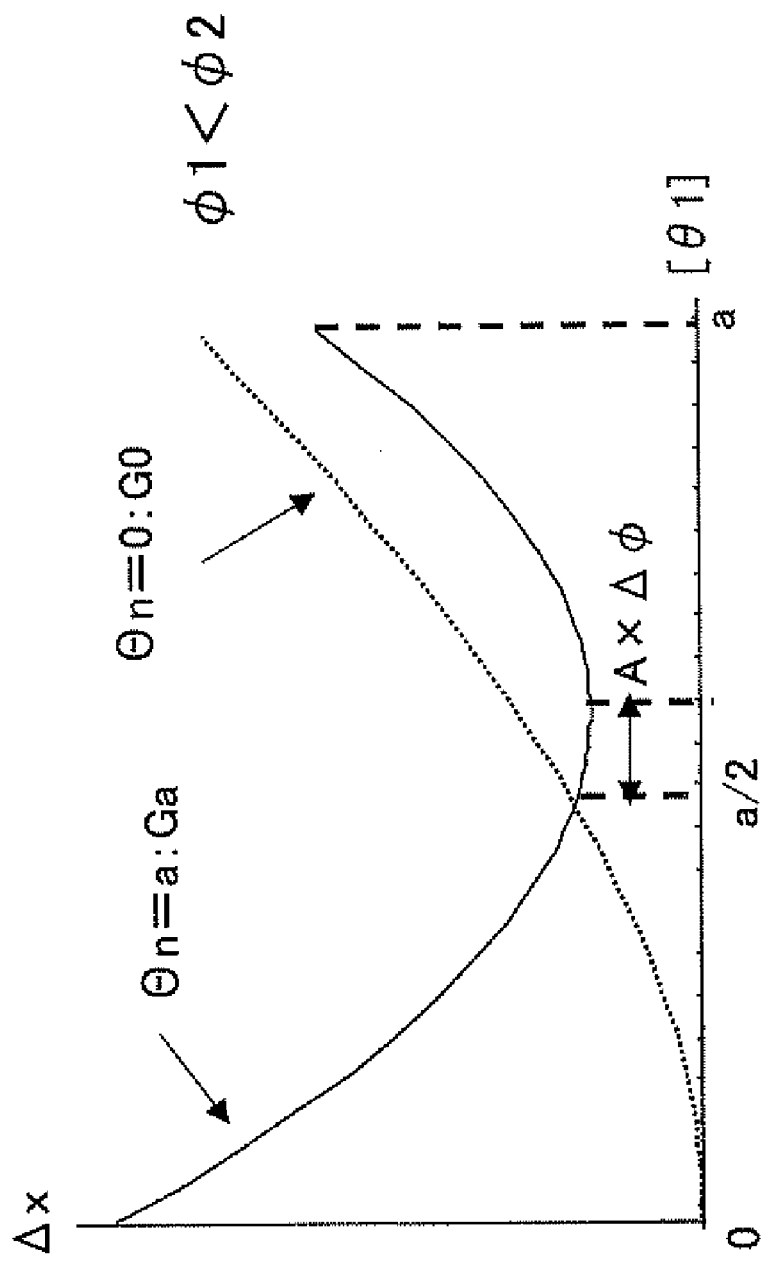
FIG. 7 is a diagram showing a graph of formula (4) in which phase differences in a case where θn=0 and in a case where θn=a as the function of θ1 according to the present embodiment.

Hence, in a case of where Φ1<Φ2 as described above, in the formula (4), the variation width of the value of θn is taken into account, and phase differences Δx when θn=0 and when θn=a are expressed as a function of θ1, which are shown in FIG. 7 as G0 and Ga, respectively. G0 and Ga in FIG. 7 indicate that the values of Δx agree when θ1=a/2, and that the maximum value of Δx becomes the minimum when θn=0 and θn=a. In other words, assuming that θn=0 and that θn=a, the value which Δx can take is made to be the minimum by means of making θ1=a/2.

Figure 8:
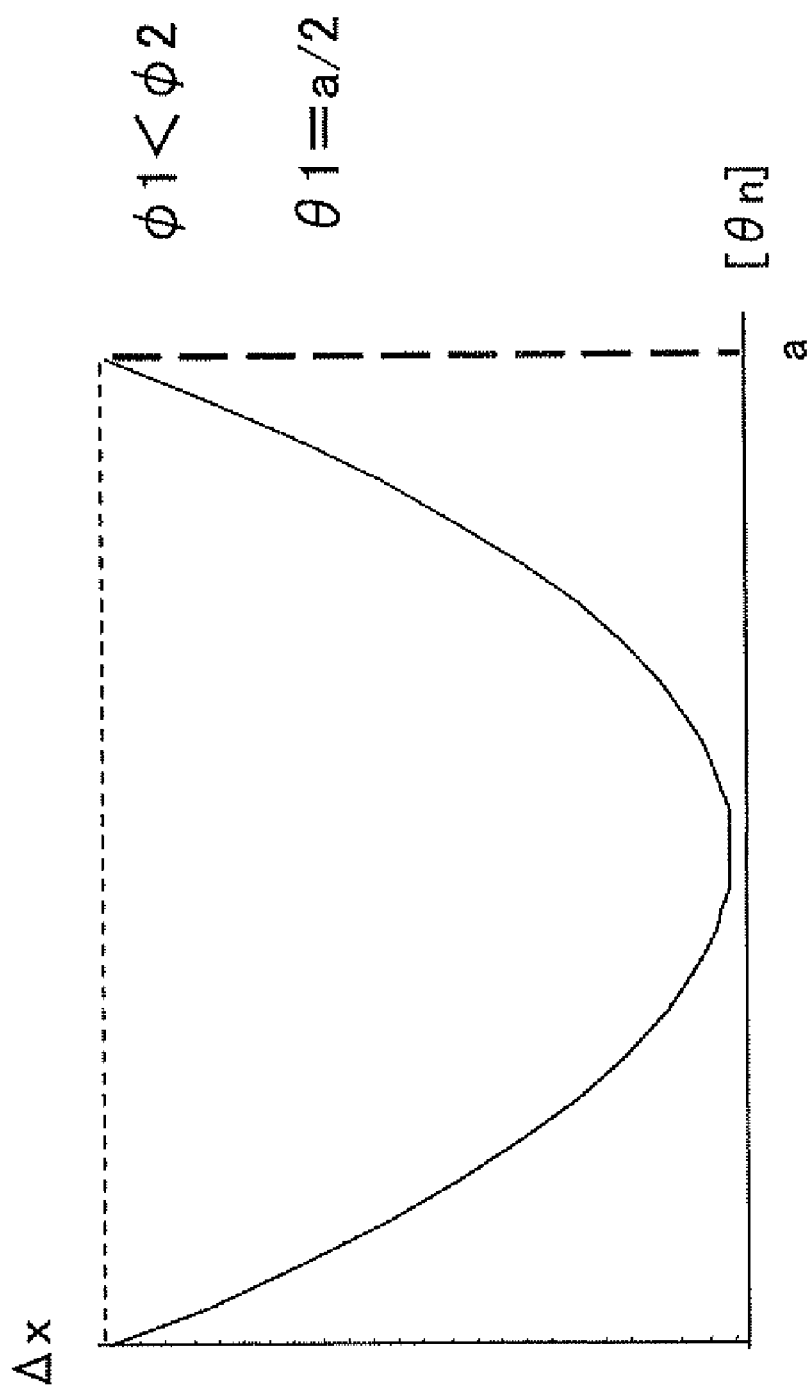
FIG. 8 is a diagram showing the graph of formula (4) as a single variable function of θn assuming that θ1=a/2 according to the present embodiment.

Further, contrarily, when it is assumed that θ1=a/2 and that the formula (4) is a single variable function of θn, Δx in a case where θn=0 and θn=a is the maximum within a range of 0≦θn≦a, as shown in FIG. 8.

Accordingly, when Φ1<Φ2, and assuming that the value of θn varies within a range of 0≦θn≦a, θ1 making PDL the minimum can be obtained by obtaining θ1 which makes Δx the minimum when θn=0 and when θn=a. In this manner, when Φ1<Φ2, Δx becomes the minimum when θ1=a/2, thereby realizing a construction in which PDL as the whole of the mirror device 10 is the minimum.

In this instance, when Φ1<Φ2, in the extremely small value θ1=a/2+A×ΔΦ1 which is derived from the formula (5), ΔΦ1 takes a value of "0". Thus, in this case, also, a construction is given in which Δx is the minimum when θ1=a/2.

Figure 18:
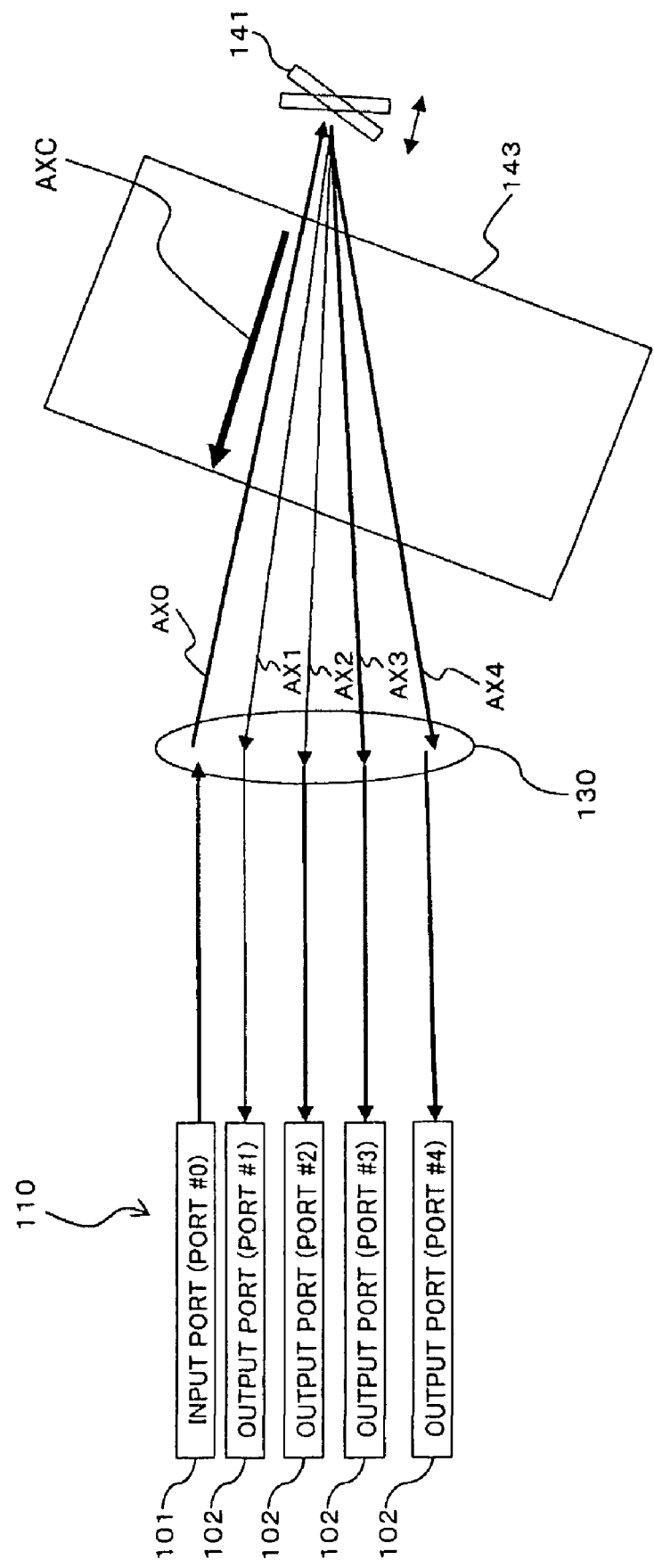
FIG. 18 is a diagram for describing a previous art.

For example, in the construction of the previous art described with reference to FIG. 18, in case of an example of actual proof of PDL of a degree of 0.71 dB remained, calculation of PDL as a wavelength selection switch by use of similar parameters results in that the result was obtained that PDL remained can be decreased down to 0.23 dB by means of making θ1=a/2 in a case where Φ1=Φ2 as already described.

In this manner, in the mirror device 10 according to the present embodiment, the crystal axis direction of the sapphire crystal 3 itself is set with respect to angles of input/output light in accordance with setting of the tilt angle of the sapphire crystal 3 with respect to the arrangement direction or the like of other optical systems such as the first ports 101 and 102, thereby making it possible to minimize the value of Δx, in other words, PDL. That is, an advantage is brought up that input light and output light to the movable mirror 1 are capable of restraining PDL on the assumption of multiple conditions of angles with respect to the crystal axis of the sapphire crystal 3 when such light passes through the sapphire crystal 3.

More specifically, out of the first optical path 11 and the second optical paths 12-1 through 12-4, the angles formed by the sapphire crystal 3 with a pair of optical paths, the first optical path 11 and the second optical path 12-4, in which the input angle and the output angle with respect to the movable mirror 1 to the both sides thereof by means of switching the reflect surface angle of the movable mirror 1, are defined as the first angle Φ1 and the second angle Φ2, respectively. Then, the third angle Φ1 is defined to be an angle made between the first optical path 11 and the axis C forming the sapphire crystal 3, and the fourth angle a is defined to be an angle made between the first optical path 11 and the second optical path 12-4 which are a pair of optical paths in which the input angle and the output angle with respect to the movable mirror 1 to the both sides thereof become the maximum by means of switching the reflect surface angle of the movable mirror 1. In this case, in accordance with the magnitude relationship between Φ1 and Φ2, which depends on setting of the above described tilt angle of the sapphire crystal 3, the sapphire crystal 3 has a construction having the value of θ1, so that Δx can be made to be the minimum, that is, PDL is made to be the minimum.

In other words, when the sapphire crystal 3 is arranged in such a manner that the first angle Φ1 is not larger than the second angle Φ2 (Φ1≦Φ2), the sapphire crystal 3 is constructed in such a manner that the third angle θ1 is substantially equal to a half of the fourth angle a (θ1=/2).

Further, when the sapphire crystal 3 is arranged in such a manner that the first angle Φ1 is larger than the second angle Φ2(Φ1>Φ2), the sapphire crystal 3 is constructed in such a manner that the third angle is substantially equal to the sum of a half of the fourth angle and a correction value of change in optical thickness between input light to the movable mirror 1 and output light from the movable mirror 1 in the sapphire crystal 3. In this instance, the above-described correction value is a value [A×ΔΦ1] obtained by multiplying the fifth angle ΔΦ, which is obtained by subtracting the first angle Φ1 from a half of the fourth angle a [a/2−Φ], by a constant A. A is a constant determined from the refractivity "ne" and "no" of ordinary light/abnormal light of the sapphire crystal 3 and the fourth angle a. Thus, the above described Φ1 is expressed as [a/2+A×ΔΦ1].

In this instance, in the mirror device 10, the above description is made, taking an example of a case where the first optical path 11 is an input optical path and the second optical paths 12-1 through 12-4 are output paths from the movable mirror 1, but it is also possible to set θ1 in a similar manner in a case where the second optical paths 12-1 through 12-4 are input optical paths and the first optical path 11 is an output optical path.

Figure 9:
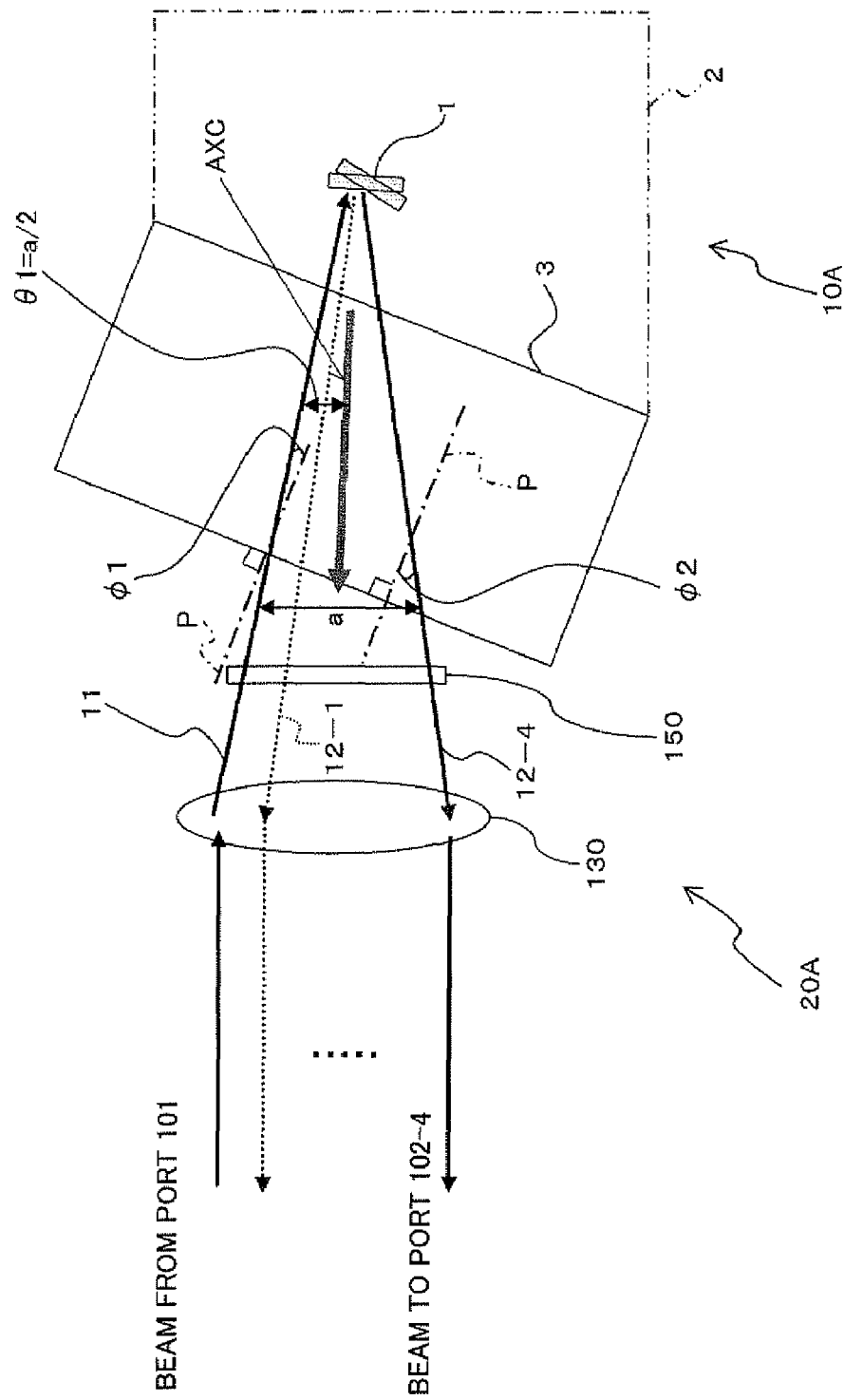
FIG. 9 is a diagram illustrating a construction example in which a mirror device according to the present embodiment is applied to a wavelength selective switch.

[C1] First Example of Construction in which Mirror Device is Applied to Wavelength Selection Switch:

FIG. 9 shows a construction example of a wavelength selection switch 20A to which a mirror switch having the above described construction is applied. Here, the wavelength selection switch 20A of FIG. 9 includes: an input/output optical system and a spectral element (reference characters 110 and 120) similar to those which are already described with reference to FIG. 15(a) and FIG. 15(b) in which such a system and an element are omitted from illustration; a light-gathering optical system 130; a λ/4 wavelength plate 150; and a mirror device 10A (see reference character 10 in FIG. 1). Here, the wavelength selection switch 20A shown in FIG. 9 has the first port 101 as an input port and the output ports 102-1 through 102-4 as output ports. The wavelength selection switch 20A has a function of selectively outputting light input from the first port 101 to the output ports 102-1 through 102-4 according to wavelengths.

Then, the sapphire crystal 3 of the mirror device 10A of FIG. 9 is arranged at a tilt direction such that Φ1≦Φ2 with respect to the above described Φ1 and Φ2. At that time, the sapphire crystal 3 is constructed in such a manner that the third angle θ1 forming the first optical path 11 as an input optical path and axis C AXC is substantially equal to a half of the fourth angle a (θ1=a/2).

As a result, in the wavelength selection switch 20A, the sapphire crystal 3 is constructed in such a manner that it has the optimal axis C direction AXC of the sapphire crystal 3 due to its approximately uniquely determined which is different from the angle from the first optical path 11, so that it is possible to reduce generation of birefringence. That is, an advantage is provided that it is possible to manufacture wavelength section switches in which PDL satisfies regulations of the use of the system.

Figure 10:
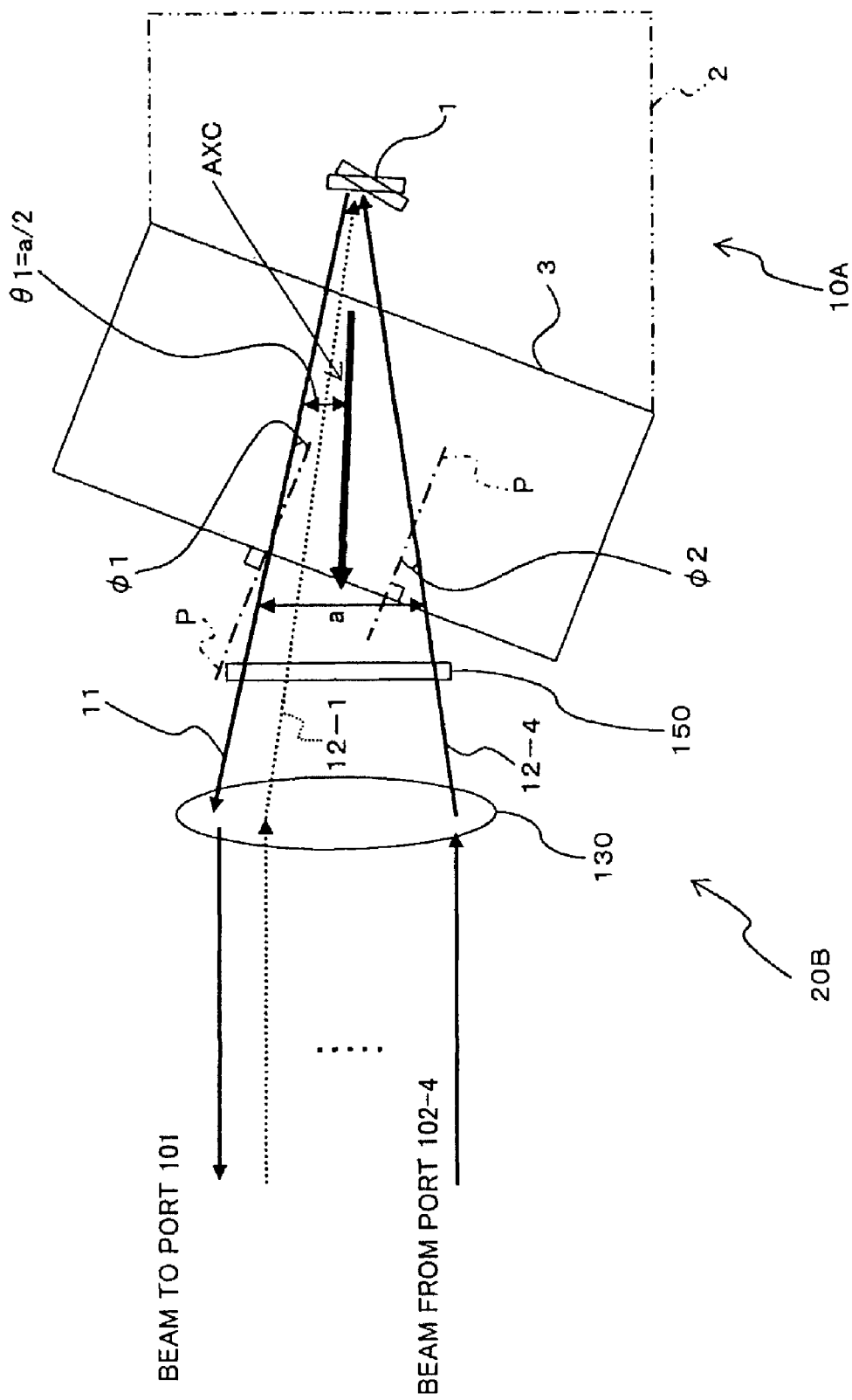
FIG. 10 through FIG. 12 each are diagrams illustrating construction examples in which a mirror device according to the present embodiment is applied to a wavelength selective switch.

[C2] Second Example of Construction in which Mirror Device is Applied to Wavelength Selection Switch:

FIG. 10 shows a construction in which input ports and an output port in the wavelength selection switch 20A that is already described with reference to FIG. 9 are exchanged. That is, the wavelength selection switch 20B shown in FIG. 11 has the output ports 102-1 through 102-4 as input ports and the first port 101 as an output port. The wavelength selection switch 20B has a function of selectively outputting light input from the output ports 102-1 through 102-4 to the first port 101 according to wavelengths.

Then, similar to the case of FIG. 9, the sapphire crystal 3 of the mirror device 10A of FIG. 10 is also arranged at a tilt direction in such a manner that Φ1≦Φ2 with respect to the arrangement direction of the first port 101 and the second port 102. At that time, the sapphire crystal 3 is constructed in such a manner that the third angle θ1 forming the first optical path 11 as axis C AXC and an output optical path is substantially equal to a half of the fourth angle a (θ1=a/2). This realizes advantages similar to those in the case of the above described C1.

Figure 11:
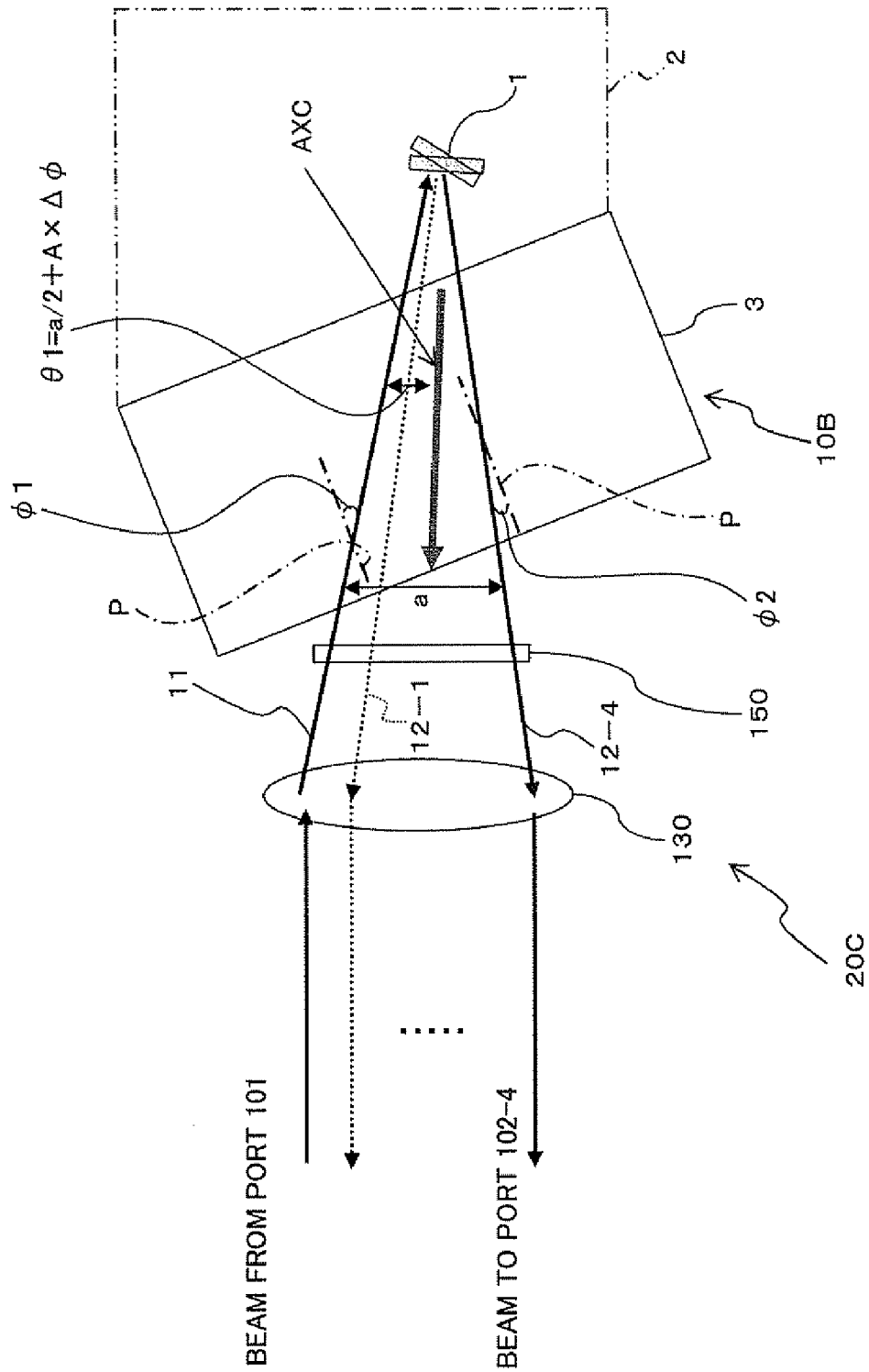

[C3] Third Example of Construction in which Mirror Device is Applied to Wavelength Selection Switch:

FIG. 11 shows a construction example of a wavelength selection switch 20C to which a mirror device with the above described construction is applied. Here, the construction of the wavelength selection switch 20C of FIG. 11 is similar to that of the wavelength selection switch 20A of FIG. 9 except but the construction of a mirror device 10B (see reference character 10 in FIG. 1).

Then, the sapphire crystal 3 of the mirror device 10B of FIG. 11 is also arranged at a tilt direction in such a manner that Φ1>Φ2, which was already described, with respect to the arrangement direction of the first port 101 and the second port 102. At that time, the sapphire crystal 3 is constructed in such a manner that θ1=a/2+A×ΔΦ1, so that similar effects and benefits to those of the above described C1 are realized.

Figure 12:
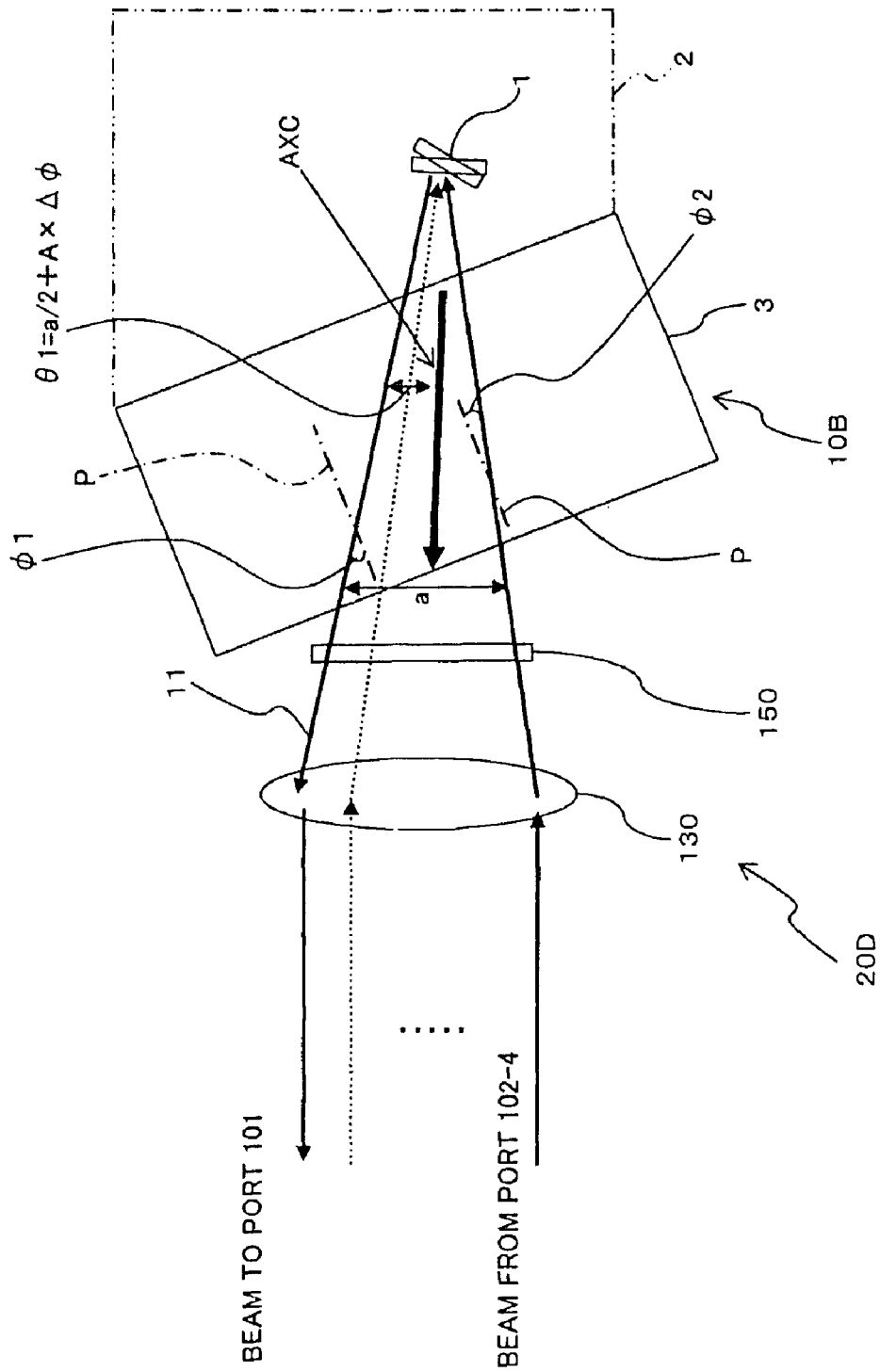

[C4] Fourth Example of Construction in which Mirror Device is Applied to Wavelength Selection Switch:

FIG. 12 shows a construction example of a wavelength selection switch 20C to which a mirror device with the above described construction is applied. Here, the construction of the wavelength selection switch 20D of FIG. 12 is similar to that of the wavelength selection switch 20B of FIG. 10 except but the construction of a mirror device 10B. Then, similar to a case already described with reference to FIG. 11, in the mirror device 10B of this FIG. 12, the sapphire crystal 3 is also arranged at a tilt direction in such a manner that Φ1>Φ2, which was already described, with respect to the arrangement directions of the first port 101 and the second port 102. At that time, the sapphire crystal 3 is constructed in such a manner that the third angle θ1=a/2+A×ΔΦ1, as described above, so that similar effects and benefits to those of the above described C1 are realized.

Figure 13:
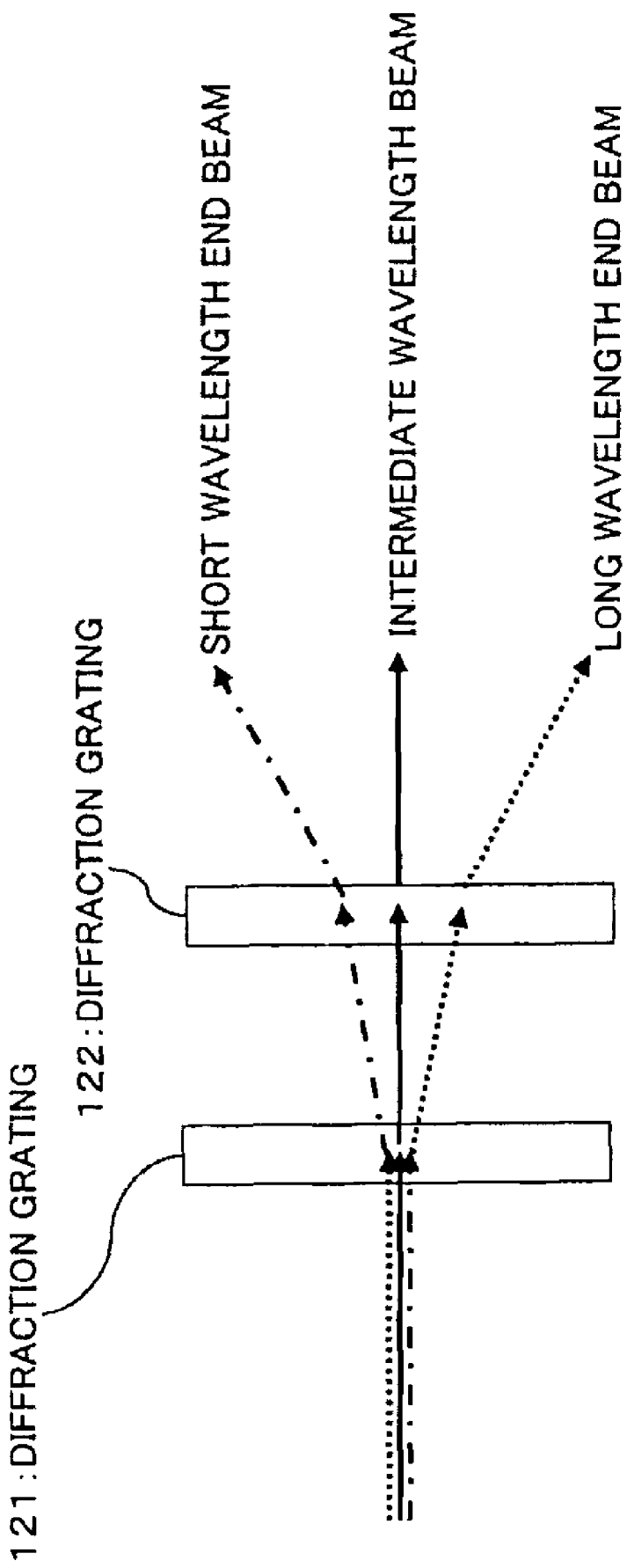
FIG. 13 and FIG. 14 each are modified examples in which a mirror device according to the present embodiment is applied to a wavelength selective switch.

[C5] Modified Example of Case in which Mirror Device is Applied to Wavelength Selection Switch:

In the wavelength selection switches 20A through 20D already described with reference to FIG. 9 through FIG. 12, in addition to the construction modes as shown as the spectral element 120 in FIG. 15(a) and FIG. 15(b), multiple sheets (two in FIG. 13) of diffraction grating 121 and 122 arranged tandem can realize the spectral element 120 as shown in FIG. 13, for example.

In this manner, the spectral element 120 formed by two sheets of diffraction grating is capable of doubling the wavelength dispersion performance. As a result, in comparison with a case of a single sheet of diffraction grating, even though a light-gathering lens with the same focus distance is provided as the light-gathering optical system 130, the arrangement distance between the movable mirrors 1 which reflect its unique wavelengths can be doubled, so that manufacturing of an MEMS mirror array becomes easy. At that time, according to the previous art, the amount of initial PDL generated at the time of input/output through the sapphire crystal 3 as the mirror device 10 is assumed to be larger than that of a construction with a single sheet of diffraction grating. However, the application of the construction as the mirror device 10 according to the present embodiment is expected to significantly suppress the generation of PDL.

Figure 14:
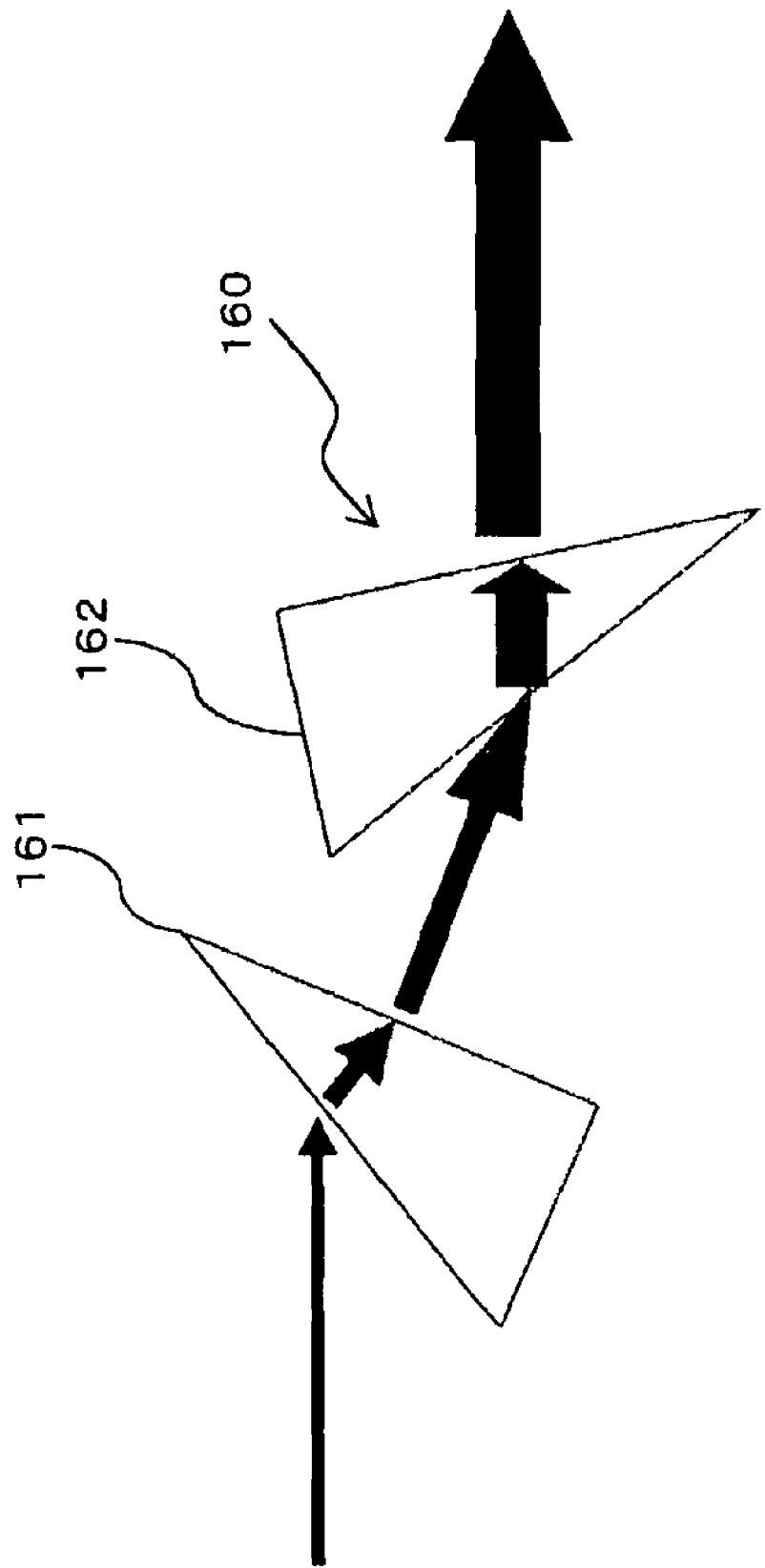

Further, as shown in FIG. 14, a single or multiple (two in FIG. 14) prisms 161 and 162 arranged tandem can be interposed between the input/output optical system 110 and the spectral element 120. This makes it possible to enlarge a beam only in the wavelength dispersion direction, thereby increasing the diffraction efficiency of the spectral element 120. FIG. 14 shows a construction made of an anamorphic prism pair 160 using two prisms 161 and 162. In this manner, even in a case of using the prisms 161 and 162, initial generation of PDL in the prisms 161 and 162 themselves is assumed. However, it is expected that application of the construction of the mirror device 10 according to the present embodiment will significantly suppress the generation of PDL.

[D] Other Modifications

In addition to the above described embodiment, the present invention should by no means be limited to the above-illustrated embodiment, and various changes or modifications may be suggested without departing from the gist of the claimed invention.

For example, although a description is made in the above embodiment as to a case where a mirror device is applied to a wavelength selection switch, in particular, application to other optical devices are not interfered according to the present invention.

Further, although a description is made above in a case where four optical paths 12-1 through 12-4 coupled to the output ports 102-1 through 102-4 are provided, there can be provided other numbers n (n is not smaller than 1) of optical paths coupled to the second ports according to the number of second ports 102 arranged.

Furthermore, on the basis of the disclosure of the embodiment above described, the ordinarily skilled in the art are able to manufacture an apparatus according to the present invention.

What is claimed is:

1. A mirror device with a mirror system having (i) a movable mirror which reflects incoming light and is capable of switching the direction of the reflect light by a reflect surface angle and (ii) a flat-shaped crystal member which is provided for the mirror system in a united form and lets incoming light from outside pass therethrough to let the light enter a reflect surface of the movable mirror and lets light reflected by the movable mirror pass therethrough to output the light outside as output light, in which mirror device it is possible to combine light bi-directionally and mutually, via the movable mirror whose reflect surface angle is switchable and the crystal member, between a single first optical path and a plurality of second optical paths arranged on the same plane as that of the first optical path with the first optical path at the end thereof, wherein the crystal member is arranged in such a manner that a first angle is not larger than a second angle, said first angle and said second angle being defined as angles made by the crystal member with respect to the first optical path and one of the second optical paths, respectively, which are a pair of paths in which, out of the first optical path and the second optical paths, an input angle and an output angle to the movable mirror become the maximum at the both sides thereof by means of switching the reflect surface angle of the movable mirror, and wherein the crystal member is constructed in such a manner that a third angle is substantially equal to a half of a fourth angle, said third angle being defined as an angle made between the first optical path and axis C of the crystal member, and said fourth angle being an angle made between the first optical path and the second optical path, which is made of the pair of optical paths passing through the crystal member in which an input angle and an output angle to the movable mirror become the maximum at the both end thereof by means of switching the reflect surface angle of the movable mirror.

2. A mirror device with a mirror system having (i) a movable mirror which reflects incoming light and is capable of switching the direction of the reflect light by a reflect surface angle and (ii) a flat-shaped crystal member which is provided for the mirror system in a united form and lets incoming light from outside pass therethrough to let the light enter a reflect surface of the movable mirror and lets light reflected by the movable mirror pass therethrough to output the light outside as output light, in which mirror device it is possible to combine light bi-directionally and mutually, via the movable mirror whose reflect surface angle is switchable and the crystal member, between a single first optical path and a plurality of second optical paths arranged on the same plane as that of the first optical path with the first optical path at the end thereof,
wherein said crystal member is arranged in such a manner that the first angle is larger than the second angle, said first angle and said second angle being defined as angles made by the crystal member with respect to the first optical path and one of the second optical paths, respectively, which are a pair of paths in which, out of the first optical path and the second optical paths, an input angle and an output angle to the movable mirror become the maximum at the both sides thereof by means of switching a reflect surface angle of the movable mirror, and
wherein the crystal member is constructed in such a manner that a third angle is substantially equal to the sum between a half of a fourth angle and a correction value of a change in optical thickness of light incoming to the movable mirror and light output from the movable mirror in the crystal member, said third angle being defined as an angle made between the first optical path and axis C of the crystal member, and said fourth angle being defined as an angle made by a pair of optical paths, which are the first optical path and the single second optical path in which light passes through the crystal member and in which an input angle and an output angle become the maximum at the both end thereof by means of switching of a reflect surface angle of the movable mirror.

3. A mirror device as set forth in claim 2, wherein the correction value is a value obtained by multiplying a fifth angle by a constant, said fifth angle being a value obtained by subtracting the first angle from a half of the fourth angle.

4. A mirror device as set forth in claim 3, wherein the constant is determined from the amount of birefringence of the crystal member and the fourth angle.

5. A mirror device as set forth in claim 1, wherein the first optical path is an input optical path to the movable mirror, and the second optical path is an output optical path from the movable mirror.

6. A mirror device as set forth in claim 2, wherein the first optical path is an input optical path to the movable mirror, and the second optical path is an output optical path from the movable mirror.

7. A mirror device as set forth in claim 1, wherein the second optical path is an input optical path to the movable mirror, and the first optical path is an output optical path from the movable mirror.

8. A mirror device as set forth in claim 2, wherein the second optical path is an input optical path to the movable mirror, and the first optical path is an output optical path from the movable mirror.

9. A mirror device as set forth in claim 1, wherein the crystal member is a sapphire crystal.

10. A mirror device as set forth in claim 2, wherein the crystal member is a sapphire crystal.

11. An optical apparatus including: an input/output optical system having a single first port and a plurality of second ports arranged on the same plane as that of the first port with the first port at the end thereof; a spectroscopic element which separates light input from the input/output optical system; a light-gathering optical system which makes each optical component separated by the spectroscopic element into coherent light; and a mirror device having a plurality of movable mirrors which are operable to deflect each optical component from the light-gathering optical system by reflection, which optical apparatus is constructed in such a manner that the first port and said plurality of second ports which form the input/output optical system are adapted to be optically combined mutually and bi-directionally through a reciprocative optical path via the spectroscopic element, the light-gathering optical system, and the mirror device,
said mirror device including: a mirror system having said plurality of movable mirrors which are arranged in the spectroscopic direction of the spectroscopic element to reflect each optical components from the light-gathering optical system as incoming light and are capable of switching the direction of the reflected light by reflect surface angles thereof; and a flat-shaped crystal member which is provided for the mirror system in a united form and lets light reflected by the movable mirrors pass therethrough to output the light to the light-gathering optical system as output light, in which mirror device it is possible to combine light bi-directionally and mutually, via the movable mirror whose reflect surface angle is switchable and the crystal member, between a single first optical path connected to the first port and a plurality of second optical paths connected to the second ports via the light-gathering optical system and the spectroscopic element arranged on the same plane as that of the first optical path with the first optical path at the end thereof,
wherein crystal member is arranged in such a manner that a first angle is not larger than a second angle, said first angle and said second angle being defined as angles made by the crystal member with respect to the first optical path and one of the second optical paths, which are a pair of paths in which, out of the first optical path and the second optical paths, an input angle and an output angle to the movable mirror become the maximum at the both sides thereof by means of switching a reflect surface angle of the movable mirror, and
wherein the crystal member is constructed in such a manner that a third angle is substantially equal to a half of a fourth angle, said third angle being defined as an angle made between the first optical path and axis C of the crystal member, and said fourth angle being defined as an angle made between the first optical path and said single second optical path, which is made by a pair of optical paths passing through the crystal member in which an input angle and an output angle to the movable mirror become the maximum at the both sides thereof by means of switching a reflect surface angle of the movable mirror.

12. An optical apparatus including: an input/output optical system having a single first port and a plurality of second ports arranged on the same plane as that of the first port with the first port at the end thereof; a spectroscopic element which separates light input from the input/output optical system; a light-gathering optical system which makes each optical component separated by the spectroscopic element into coherent light; and a mirror device having a plurality of movable mirrors which are operable to deflect each optical component from the light-gathering optical system by reflection, which optical apparatus is constructed in such a manner that the first port which forms the input/output optical system and said plurality of second ports are adapted to be optically combined mutually and bi-directionally through a reciprocative optical path via the spectroscopic element, a light-gathering optical system, and the mirror device,
said mirror device including: a mirror system having said plurality of movable mirrors which are arranged in a spectroscopic direction and reflect each optical component from the light-gathering optical system as incoming light and are operable to switch the directions of the reflected light by reflection surface angles thereof; and a flat-shaped crystal member which is provided for the mirror system in a united form and lets incoming light from the light-gathering optical system pass therethrough to enter the reflect surface of the movable mirror, and lets the light reflected by the movable mirrors pass therethrough to output the light to the light-gathering optical system as output light, in which mirror device it is possible to combine light bi-directionally and mutually, via the movable mirror whose reflect surface angle is switchable and the crystal member, between a single first optical path connected to the first port via the light-gathering optical system and the spectroscopic element and a plurality of second optical paths connected to the second port via the light-gathering optical system and the spectroscopic element arranged on the same plane as that of the first optical path with the first optical path at the end thereof, wherein said crystal member is arranged in such a manner that a first angle is larger than a second angle, said first angle and said second angle being defined as angles made by the crystal member with respect to the first optical path and one of the second optical paths, respectively, which are a pair of paths in which, out of the first optical path and the second optical paths, an input angle and an output angle to the movable mirror become the maximum at the both sides thereof by means of switching a reflect surface angle of the movable mirror, and wherein the crystal member is constructed in such a manner that a third angle is substantially equal to the sum between a half of a fourth angle and a correction value of a change in optical thickness of light incoming to the movable mirror and light output from the movable mirror in the crystal member, said third angle being defined as an angle made between the first optical path and axis C of the crystal member, and said fourth angle being defined as an angle made by a pair of optical paths passing through the crystal member, which are the first optical path and one of the second optical path and in which an input angle and an output angle become the maximum at the both sides thereof by means of switching of a reflect surface angle of the movable mirror.

13. An optical apparatus asset for thin claim 11, wherein the first port corresponding to the first optical path works as an input port, and the second port corresponding to the second optical path works as an output port, by means of constructing the first optical path as an input optical port to the movable mirror and the second optical path as an output optical port from the movable mirror, thereby said optical apparatus being adapted to selectively switch light input through the first port to any of the second port by the unit of wavelength by means of switching the reflect surface angles of said plurality of movable mirrors.

14. An optical apparatus as set forth in claim 12, wherein the first port corresponding to the first optical path works as an input port, and the second port corresponding to the second optical path works as an output port, by means of constructing the first optical path as an input optical port to the movable mirror and the second optical path as an output optical port from the movable mirror, thereby said optical apparatus being adapted to selectively switch light input through the first port to any of the second port by the unit of wavelength by means of switching the reflect surface angles of said plurality of movable mirrors.

15. An optical apparatus as set forth in claim 11, wherein the second port corresponding to the second optical path works as an input port, and the first port corresponding to the first optical path works as an output port, by means of constructing the second optical path as an input optical path to the movable mirror and the first optical path as an output optical path from the movable mirror, thereby said optical apparatus being adapted to selectively switch light input through the second port to any of the first port by the unit of wavelength by means of switching the reflect surface angles of said plurality of movable mirrors.

16. An optical apparatus as set forth in claim 12, wherein the second port corresponding to the second optical path works as an input port, and the first port corresponding to the first optical path works as an output port, by means of constructing the second optical path as an input optical path to the movable mirror and the first optical path as an output optical path from the movable mirror, thereby said optical apparatus being adapted to selectively switch light input through the second port to any of the first port by the unit of wavelength by means of switching the reflect surface angles of said plurality of movable mirrors.

17. An optical apparatus as set forth in claim 11, wherein the spectroscopic element is made of a plurality of sheets of diffraction grating arranged tandem.

18. An optical apparatus as set forth in claim 12, wherein the spectroscopic element is made of a plurality of sheets of diffraction grating arranged tandem.

19. An optical apparatus as set forth in claim 11, wherein a pair of prisms is interposed between the input/output optical system and the spectroscopic element.

20. An optical apparatus as set forth in claim 12, wherein a pair of prisms is interposed between the input/output optical system and the spectroscopic element.

21. An optical apparatus as set forth in claim 11, wherein a $\lambda/4$ wave plate is interposed between the light-gathering optical system and the mirror device.

22. An optical apparatus as set forth in claim 12, wherein a $\lambda/4$ wave plate is interposed between the light-gathering optical system and the mirror device.

* * * * *

UNITED STATES PATENT AND TRADEMARK OFFICE
CERTIFICATE OF CORRECTION

PATENT NO. : 7,706,049 B2 Page 1 of 1
APPLICATION NO. : 12/033959
DATED : April 27, 2010
INVENTOR(S) : Hirofumi Aota et al.

It is certified that error appears in the above-identified patent and that said Letters Patent is hereby corrected as shown below:

Column 21, Line 44, change "asset for thin" to --as set forth in--.

Signed and Sealed this

Sixth Day of July, 2010

David J. Kappos
*Director of the United States Patent and Trademark Office*